(12) United States Patent
Costin, Sr. et al.

(10) Patent No.: US 9,050,686 B2
(45) Date of Patent: Jun. 9, 2015

(54) LASER METHODS TO CREATE EASY TEAR OFF MATERIALS AND ARTICLES MADE THEREFROM

(75) Inventors: Darryl J. Costin, Sr., Westlake, OH (US); Darryl J. Costin, Jr., Avon, OH (US); Kimberly L. Ripley, Westlake, OH (US)

(73) Assignee: RevoLaze, LLC, Westlake, OH (US)

( * ) Notice: Subject to any disclaimer, the term of this patent is extended or adjusted under 35 U.S.C. 154(b) by 517 days.

(21) Appl. No.: 12/884,645

(22) Filed: Sep. 17, 2010

(65) Prior Publication Data

US 2011/0070390 A1 Mar. 24, 2011

Related U.S. Application Data

(60) Provisional application No. 61/243,579, filed on Sep. 18, 2009.

(51) Int. Cl.
*B23K 26/08* (2014.01)
*B23K 26/38* (2014.01)
*B23K 26/40* (2014.01)

(52) U.S. Cl.
CPC ........... *B23K 26/0846* (2013.01); *Y10T 428/15* (2015.01); *B23K 26/381* (2013.01); *B23K 26/4065* (2013.01); *B23K 26/4005* (2013.01); *B23K 26/402* (2013.01); *B23K 26/404* (2013.01); *B23K 26/406* (2013.01)

(58) Field of Classification Search
CPC .. B23K 26/365; B23K 26/367; B23K 26/123; B23K 26/10; B23K 26/1405
USPC .................. 219/121.74, 121.76, 121.85, 384, 219/121.67–121.72; 264/400, 409, 482, 264/156, 413; 428/43, 130, 131, 138, 571; 131/281; 156/250–272.8; 216/17, 94; 101/226; 438/463
See application file for complete search history.

(56) References Cited

U.S. PATENT DOCUMENTS

| | | |
|---|---|---|
| 3,720,784 A | 3/1973 | Maydan et al. |
| 3,789,421 A | 1/1974 | Chivian et al. |
| 4,024,545 A | 5/1977 | Dowling et al. |
| 4,629,858 A | 12/1986 | Kyle |
| 4,847,184 A | 7/1989 | Taniguchi et al. |
| 4,861,620 A | 8/1989 | Azuma et al. |
| 4,947,022 A | 8/1990 | Ostroff et al. |
| 5,017,423 A | 5/1991 | Bossmann et al. |
| 5,075,195 A | 12/1991 | Babler et al. |
| 5,171,450 A | 12/1992 | Hoots |
| 5,171,650 A | 12/1992 | Ellis et al. |
| 5,185,511 A | 2/1993 | Yabu |
| 5,200,592 A | 4/1993 | Yabu |
| 5,382,773 A * | 1/1995 | Kurihara et al. ........... 219/121.7 |

(Continued)

FOREIGN PATENT DOCUMENTS

DE 3916126 11/1990
DE 196 36 429 C1 11/1997

(Continued)

*Primary Examiner* — Dana Ross
*Assistant Examiner* — Michael Laflame, Jr.
(74) *Attorney, Agent, or Firm* — Berenato & White, LLC

(57) ABSTRACT

A method of creating an easily torn material using laser etching, as well as articles produced therefrom is provided. As opposed to standard perforations, a laser is used to etch a line in a sheet of material. The line allows the material to be easily torn by a user, yet exhibits enough tensile strength to prevent tearing during regular use.

26 Claims, 16 Drawing Sheets

(56) References Cited

U.S. PATENT DOCUMENTS

| | | | |
|---|---|---|---|
| 5,567,207 A | 10/1996 | Lockman et al. | |
| 5,585,018 A * | 12/1996 | Kanaoka et al. | 219/121.72 |
| 5,882,572 A * | 3/1999 | Lutze et al. | 264/400 |
| 5,990,444 A | 11/1999 | Costin | |
| 6,140,602 A | 10/2000 | Costin | |
| 6,235,369 B1 | 5/2001 | Shepard et al. | |
| 6,252,196 B1 | 6/2001 | Costin et al. | |
| 6,315,202 B2 | 11/2001 | Costin et al. | |
| 6,495,237 B1 | 12/2002 | Costin | |
| 6,576,862 B1 | 6/2003 | Costin et al. | |
| 6,660,202 B2 | 12/2003 | Shepard et al. | |
| 6,664,505 B2 | 12/2003 | Martin | |
| 6,685,868 B2 | 2/2004 | Costin | |
| 6,753,501 B1 | 6/2004 | Costin et al. | |
| 6,807,456 B1 | 10/2004 | Costin et al. | |
| 6,819,972 B1 | 11/2004 | Martin et al. | |
| 6,858,815 B1 * | 2/2005 | Costin | 219/121.69 |
| 7,699,896 B1 | 4/2010 | Colwell | |
| 2002/0068668 A1 * | 6/2002 | Chow et al. | 493/62 |
| 2003/0019780 A1 | 1/2003 | Parodi et al. | |
| 2003/0107203 A1 * | 6/2003 | Bauer et al. | 280/728.3 |
| 2008/0280088 A1 * | 11/2008 | Baum | 428/43 |
| 2008/0290075 A1 * | 11/2008 | Wittenbecher | 219/121.7 |
| 2009/0159192 A1 * | 6/2009 | Bannister | 156/250 |

FOREIGN PATENT DOCUMENTS

| | | |
|---|---|---|
| EP | 0473517 A2 | 3/1992 |
| GB | 2294656 | 5/1996 |
| JP | 1-95885 | 4/1989 |
| JP | 3-45578 | 2/1991 |
| JP | 5-138374 | 6/1993 |
| WO | 93/22944 | 11/1993 |
| WO | 0194098 A1 | 12/2001 |
| WO | 2004096659 A2 | 11/2004 |

* cited by examiner

LASER METHODS TO CREATE EASY TEAR OFF MATERIALS AND ARTICLES MADE THEREFROM

CROSS-REFERENCE TO RELATED APPLICATIONS

This application claims the benefit of priority of provisional application 61/243,579 filed on Sep. 18, 2009, the disclosure of which is herein incorporated by reference.

FIELD OF THE INVENTION

The field of the invention is directed to materials having premade tear lines and the method of making such articles.

BACKGROUND

Providing a product which can be easily torn by hand but retains enough tensile strength to prevent undesirable tearing is typically achieved through perforations. Perforations are traditionally created by a mechanical cutter, consisting of a number of sharpened points spaced apart by depressions. As the cutter comes in contact with the material, the points create small holes. Where a depression makes contact, the material is left intact. This sequence of spaced-apart holes creates a material that under normal circumstances will remain intact but will tear when a certain amount of force is applied. The amount of force needed to tear the material will depend on the type of material, as well as the size and spacing of the holes. The size and the spacing of the holes may be varied by changing the properties of the cutter.

The use of a cutter to create perforations can be costly. In products that come pre-perforated, such as stamps, toilet paper, paper towels, etc., a large number of cutters must be used across a large web of material to provide a high throughput rate. These cutters must be serviced or often replaced when they become worn out. Additionally, the wear on the cutters leads to variations in the perforation size and depth so that operating parameters must be changed constantly to provide a uniform product.

In products that are simultaneously perforated and torn by a user, such as tape, aluminum foil, plastic wrap, etc., a metal cutter must either be provided with the product or acquired separately. This results in extra cost to the manufacturer or the user.

One way to overcome the problems of traditional cutting devices is to perforate material using lasers. Conventional laser methods produce perforations by forming a series of holes across the material. One advantage of using lasers to perforate material is that the laser vaporizes a small, well-defined point, rather than puncture or tear the material as with typical mechanical perforation machines. The use of lasers, however, still has a number of disadvantages.

It has been found that small holes are more efficient for perforations, because larger holes will not tear easily enough. Smaller holes, however mean a smaller operating area or "field size" because beam diameter is proportionate to the laser's field size. For example, a laser having a four inch field size is capable of creating holes having a diameter of about 0.02 mm. Though this hole size may be ideal for perforating certain materials, a web of material that is sixty inches across will require fifteen separate lasers in synchronized operation to successfully create the desired perforations.

Numerous problems exist in using multiple lasers to perforate material. The more lasers that are used the more complex a system becomes, requiring control and oversight for each unit. The lasers have to be perfectly synchronized in order to produce matching perforations. Considering no two lasers are identical in energy output, each laser has to be carefully calibrated and adjusted to perform in synchronization or inconsistencies will be obvious from one laser to another, and therefore in the perforations across the material. A malfunction or variation in any of the lasers would render the product unusable and require an entire production shutdown for maintenance.

An alternative to multiple lasers involves using beam splitters to produce separate beams from a single laser. There is a limit to the amount a laser beam can be split and remain effective so that more than one laser would still be required, providing the same problems as before but compounded by the further complexity of the beam splitter. Additionally, systems using split laser beams can be more costly than traditional ones.

In addition to the above mentioned deficiencies, typical laser perforation systems require a variety of complex process information. The hole size, hole shape, hole spacing, and hole amount must be controlled depending on the material in order to produce a product that is easy to tear. When multiple lasers must be used, each must have its own dedicated control system and the processing information must be entered and precisely implemented for each laser.

SUMMARY

A first aspect of the invention is directed to a sheet material having a first surface and a second surface. A laser-etched line is present on one of the surfaces. The material will separate along the laser-etched line upon application of a force.

Also provided is a method of making an easily torn sheet of material. The method comprises the steps of providing a web of material and a laser having a working area. The material is moved across the working area and the laser etches a line in a surface of the material.

Additional aspects of the invention, including additional methods, systems, devices, and articles will become apparent upon viewing the accompanying drawings and reading the detailed description below.

DETAILED DESCRIPTION OF EXEMPLARY EMBODIMENT(S) AND EXEMPLARY METHOD(S)

Figure 1A:
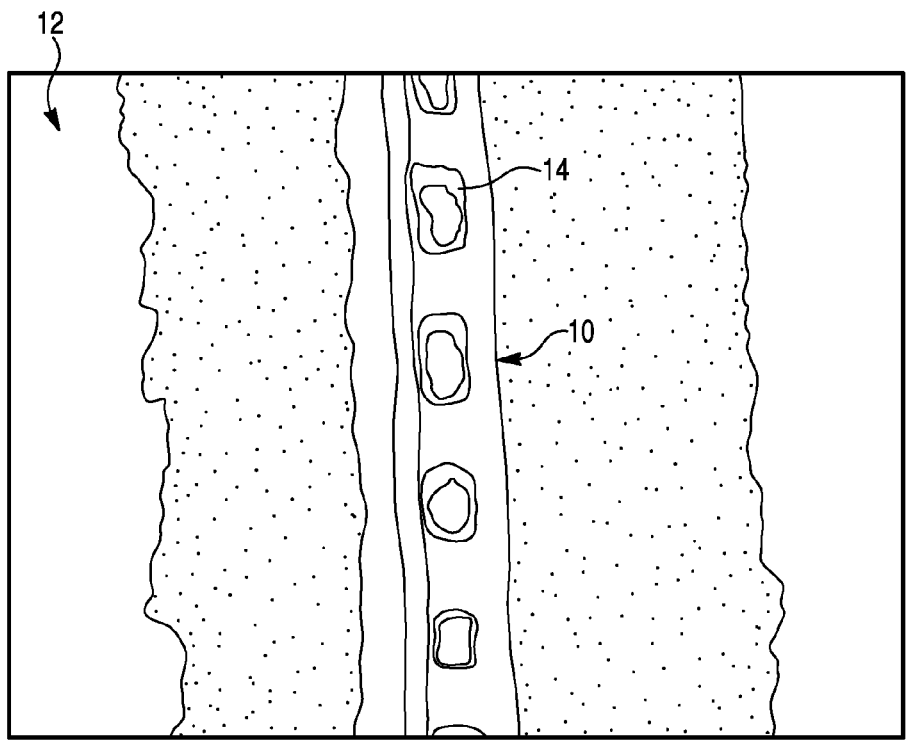
FIG. 1A is an exemplary laser etched line.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

In various exemplary embodiments, the deficiencies in the prior art are overcome by using a laser to etch a line in the surface of a material web. A high powered, large field size laser can be used to create periodic laser etched lines across a moving web of material. As best shown in FIGS. 1A-9B, this line may be comprised of a combination of sections that partially penetrate the surface, sections which fully penetrate the surface, and/or sections which do not penetrate the surface, as opposed to creating individual uniformly spaced perforations. The line may be etched in a single motion so that it is created in a single pass or scan of the laser across the web of material. Additionally, the line may be continuous across the width of the material. Etching in such a way allows the material to be easily torn by hand, yet maintain enough tensile strength to prevent undesirable separation or tearing during regular use. The control of the laser power, scan speed, duty cycle, and frequency of the laser will control the characteristics of the etching. Controlling these variables simplifies the operation with respect to typical methods which require complex inputs to control the hole size, hole shape, hole spacing, and the amount of holes. Additional variables which may be adjusted include: the control factor settings, which regulate the power of the laser during deceleration and acceleration at boundary areas to maintain desirable characteristics of the etching; the jump speed which controls the speed of the laser in between processing points where the laser is inactive; size of the laser objective lens; the wavelength of the laser; and the focus offset of the laser. Utilizing these methods, scan speeds from 10 meters per second to 65 meters per second and faster can be achieved. This is substantially faster than traditional laser systems which stop to create individual holes at separate points along a straight line.

Through this method, a single laser having a large field size may be used on a variety of materials having different characteristics. Though in certain circumstances more than one laser may be needed, the number for any application will be significantly less than with traditional methods. Therefore the number of lasers needed is greatly reduced so that a larger web of material may be etched for less cost, in less time, and with less oversight and control.

Depending on the material and its characteristics, the laser power may be adjusted. For example, a laser having a continuous power output of 3,000 watts, as distinguished from the power output when the laser has a temporary energy surge or is pulsed, can be varied by adjusting the power setting of the laser as a percentage of the overall power.

The scan speed is the speed at which the laser beam and the surface of the material move relative to each other. This speed can be varied by controlling the movement of the laser beam, the movement of the material, or a combination of both.

The duty cycle is the proportion of time that the laser is turned on during each pulse. Changing the duty cycle controls the amount of power delivered to the material. For example, power levels between 1,000 and 3,000 watts may be achieved using a single laser simply by controlling the duty cycle.

The power delivered to the material may also be changed by adjusting the frequency of the laser. The frequency of the laser is the number of emitted pulses per second. Therefore, the higher the frequency the greater the power transfer to the material will be.

For a given laser system, field size, material thickness, and/or material characteristics, there exist a variety of laser settings that produce samples that are easily torn along the laser-etched line yet retain sufficient tensile strength to avoid undesirable tearing during application. Throughout this specification, the concept of a material being easily torn yet retaining sufficient tensile strength will be repeatedly discussed. It should be noted that there is no absolute concrete variable to quantify this concept, as different materials and their intended applications will result in different values. For example, easily torn can mean that a user tears the material without over-exerting themselves and that the material will tear in a relatively straight line along the etching. Sufficient tensile strength is meant that standard handling, and even slight pulling or tugging, of the etched material does not result in separation along the etched line so that accidental and unintended separation is prevented. In another example, the etched material may be placed under some tensile stress without separation but will easily separate along the etched line under shear stress. In an exemplary embodiment, the tensile strength of the laser etched portion of the material will be between 2.25 lbs/in and 67 lbs/in, for example between 3 lb/in and 22 lb/in, or between 4 lb/in and 15 lb/in, wherein the length unit represents the width of the tape. As discussed above, the exact values will differ based on material and application. Appropriate values will be understood by those of ordinary skill in the art upon viewing this disclosure.

By adjusting the laser power, scan speed, duty cycle, and frequency, ideal results can be achieved. For example, a 3,000 watt $CO_2$ laser with a 20 inch field size was used to etch a web made from oriented polypropylene (OPP). One exemplary setting that has been derived found that the laser operating at 40% power, with a 60% duty cycle, a scan speed of 20 m/s and a frequency of 60 kHz produced a laser etched OPP tape, suitable for use as packing tape, that is easy to tear along the etched line yet has sufficient strength to resist tearing during normal use. Other sets of operating variables, however, can also produce favorable characteristics. Conventional packing tape normally requires a cutter that cuts the tape as required because the high tensile prevents the tape from being easily torn, whereas OPP tape according to the invention eliminates the need for the cutter because the tape may be torn manually as required. An example of some of the settings derived to produce favorable characteristics in OPP tape using a 3,000 watt $CO_2$ laser are presented in Table 1 below. The data shown in Table 1 represents different operating parameters used to etch a line into a tape material. Each set of values was tested and a tear rating and tensile rating were assigned with 1 being a poor tensile or tear rating and 5 being excellent.

TABLE 1

| Power (%) | Duty Cycle (%) | Scan Speed (m/s) | Frequency (khz) | Tear Rating | Tensile Rating |
|---|---|---|---|---|---|
| 55 | 60 | 20 | 60 | 4 | 4 |
| 30 | 60 | 20 | 40 | 4 | 4 |
| 35 | 60 | 20 | 60 | 4 | 4 |
| 40 | 60 | 20 | 20 | 5 | 3 |
| 35 | 60 | 20 | 20 | 4 | 5 |
| 30 | 60 | 20 | 20 | 3 | 5 |
| 60 | 60 | 20 | 10 | 4 | 3 |
| 55 | 60 | 20 | 10 | 4 | 4 |
| 50 | 60 | 20 | 10 | 4 | 4 |
| 45 | 60 | 20 | 10 | 3 | 4 |
| 50 | 60 | 25 | 40 | 4 | 4 |
| 40 | 60 | 25 | 40 | 4 | 4 |
| 50 | 60 | 25 | 20 | 4 | 4 |
| 45 | 60 | 25 | 20 | 4 | 5 |
| 40 | 60 | 25 | 20 | 4 | 5 |
| 55 | 60 | 25 | 10 | 4 | 4 |
| 55 | 60 | 25 | 10 | 4 | 4 |
| 60 | 60 | 25 | 10 | 4 | 4 |
| 65 | 60 | 25 | 10 | 5 | 4 |
| 45 | 60 | 25 | 10 | 4 | 5 |
| 45 | 60 | 30 | 20 | 4 | 4 |
| 50 | 60 | 30 | 20 | 4 | 4 |
| 55 | 60 | 30 | 20 | 4 | 4 |
| 40 | 60 | 30 | 20 | 4 | 5 |
| 60 | 60 | 30 | 10 | 4 | 4 |
| 65 | 60 | 30 | 10 | 4 | 4 |
| 55 | 50 | 20 | 60 | 5 | 4 |
| 55 | 45 | 20 | 60 | 5 | 4 |
| 60 | 30 | 20 | 20 | 4 | 5 |
| 60 | 35 | 20 | 20 | 4 | 4 |
| 60 | 50 | 20 | 10 | 4 | 4 |
| 60 | 45 | 20 | 10 | 4 | 4 |
| 60 | 40 | 20 | 10 | 4 | 5 |
| 60 | 35 | 20 | 10 | 4 | 5 |
| 65 | 40 | 20 | 10 | 4 | 4 |

As shown by Table 1, different combinations can be used to achieve desirable results. Some combinations of these settings produce excellent tear and good tensile, some combinations produce good tear and excellent tensile, and some combinations produce good tear and good tensile. However, it is emphasized that the majority of setting combinations for laser power, duty cycle, scan speed and frequency do not produce sufficient results in that either the tear is unsatisfactory or the tensile is unsatisfactory.

As best shown in Table 1, the laser output can be controlled in terms of the individual operating parameters. The laser output, however, can be alternatively controlled in terms of Energy Density Per Unit Time (EDPUT). EDPUT is a parameter that defines the amount of power that is applied to a certain area in a certain time. The EDPUT may be expressed in watts-sec/$mm^3$ or other analogous units which express continuous laser power (watts) divided by the speed of movement of the laser spot (mm/s) and the area of the laser spot ($mm^2$). The EDPUT can be controlled by changing the power, duty cycle, or speed of the laser relative to the work piece for a given power, or by other parameters, and a combination of parameters. EDPUT can be controlled to stay within a range to achieve desired results in a repeatable fashion. Further details about EDPUT determination may be found in U.S. Pat. No. 5,990,444, the disclosure of which is incorporated herein by reference.

For example, to create an easily torn material, the speed of the laser may be between 10 and 50 m/s, the spot diameter of the laser may be between 0.05 and 0.3 mm, and the power of the laser may be between 1000 and 5000 W. This results in an EDPUT range between 0.28 and 254.77 watts-sec/$mm^3$. It should be noted that different parameters may be altered and still result in the same EDPUT value; however, the same EDPUT value may not always provide the same tear and tensile properties.

It should also be noted that a wide variety of operating parameters are considered under the scope of the present invention. Slight variations in the operating parameters may produce different results. The type, surface qualities, and thickness of the material will result in variations from the exemplary values discussed herein while still falling under the scope of the present invention. The present invention eliminates the need to control hole size, hole spacing, and the number of holes. Instead a laser scans the surface of a material web, changing the material so that it can be easily torn yet retain sufficient tensile strength. Though straight lines are discussed and shown in the exemplary embodiments, other types of lines including wavy, curved, or zig-zag lines may be used.

Figure 7A:
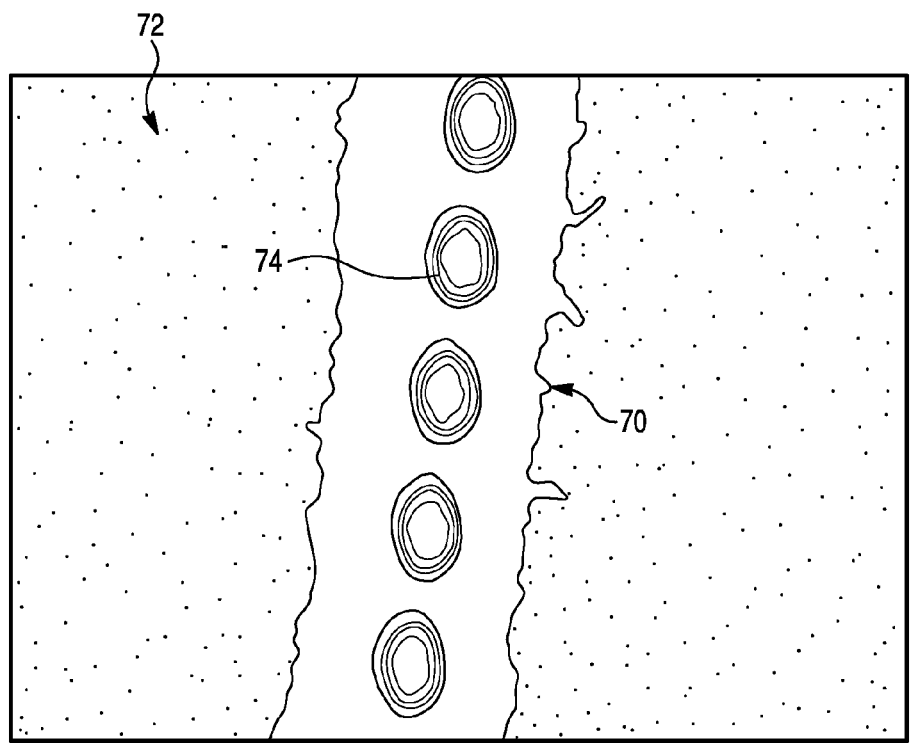
FIG. 7A is an exemplary laser etched line.
Figure 7B:
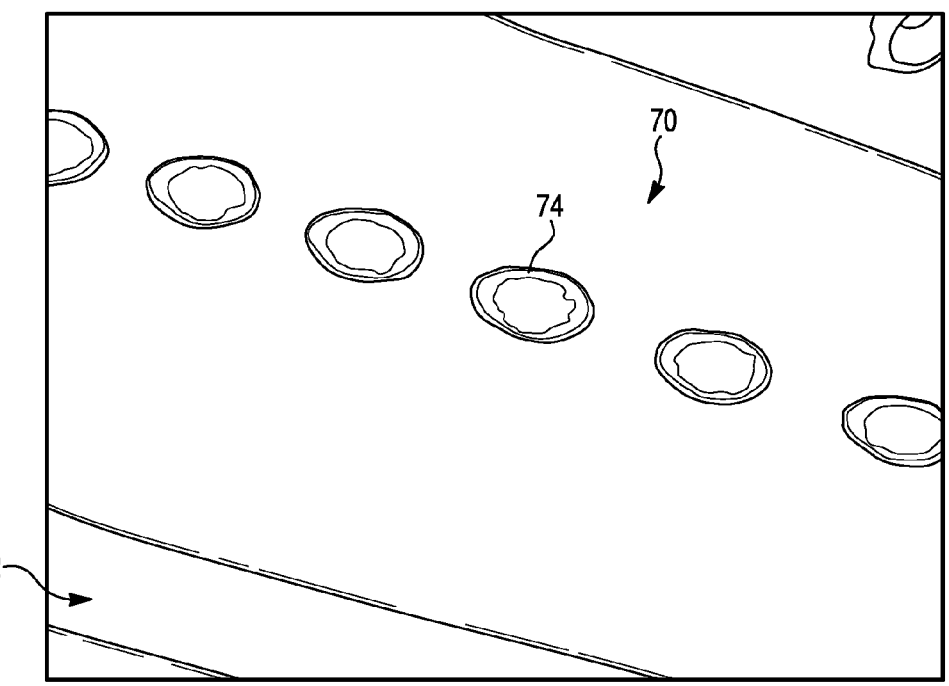
FIG. 7B is a magnified view of the laser etched line shown in FIG. 7A.
Figure 7C:
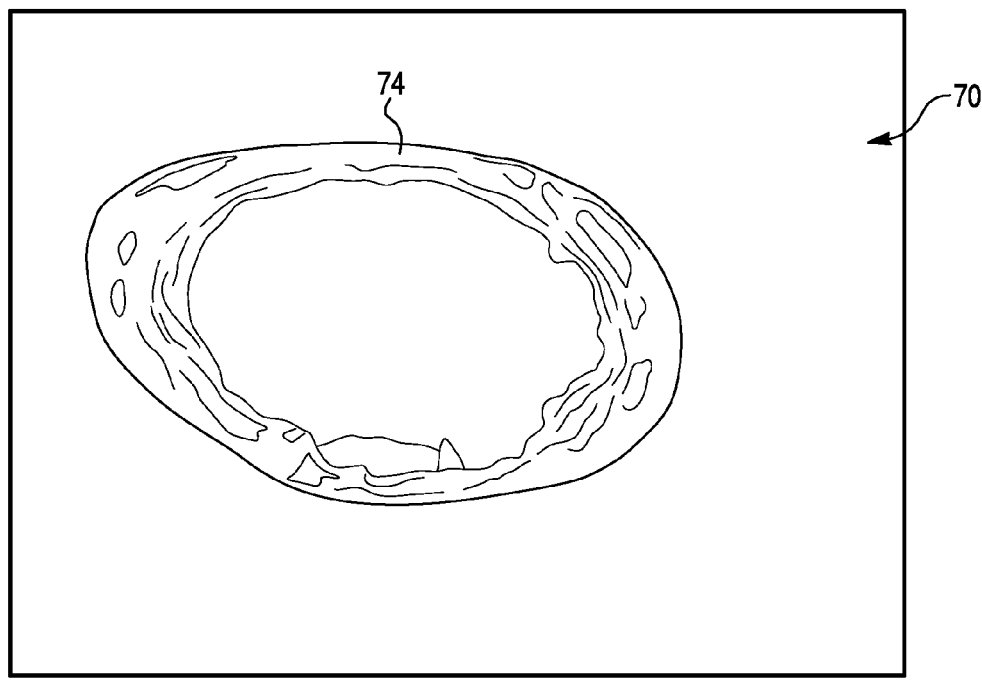
FIG. 7C is a magnified view of the laser etched line shown in FIG. 7B.
Figure 8A:
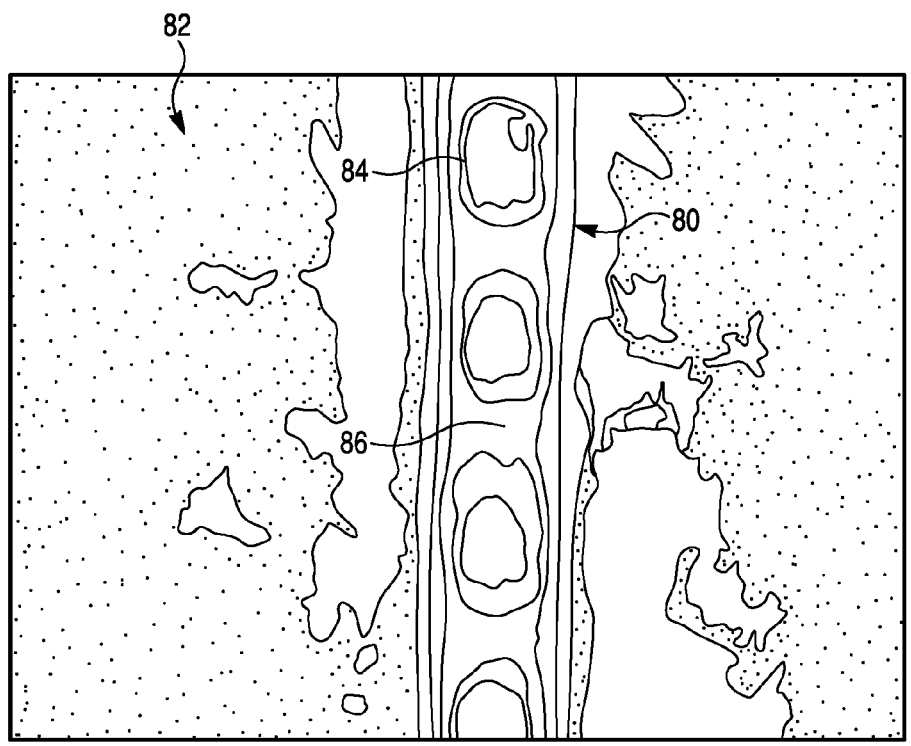
FIG. 8A is an exemplary laser etched line.
Figure 8B:
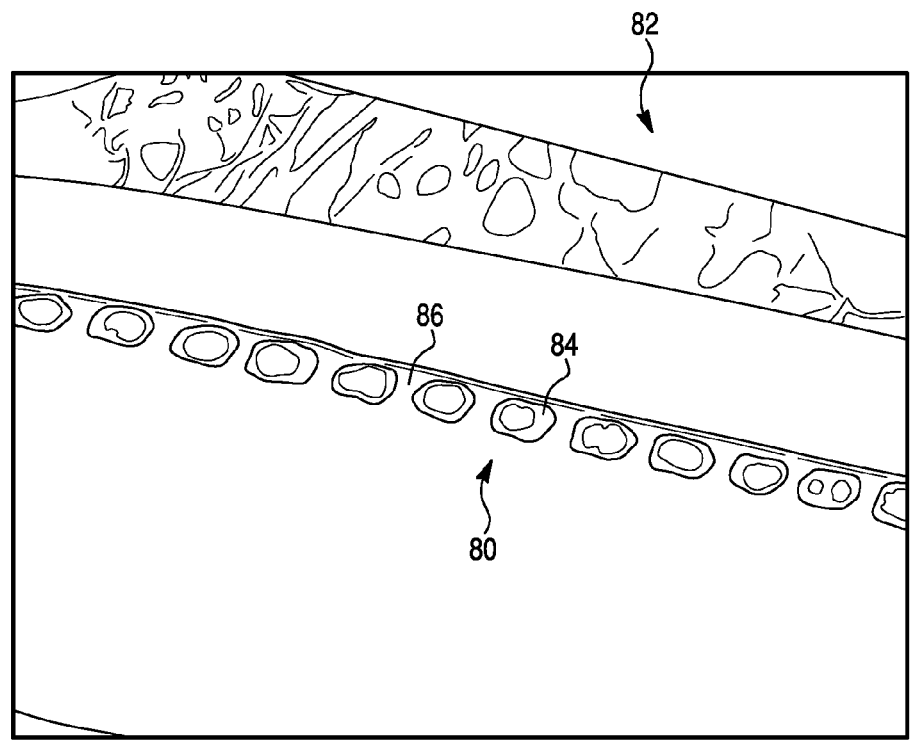
FIG. 8B is a magnified view of the laser etched line shown in FIG. 8A.
Figure 8C:
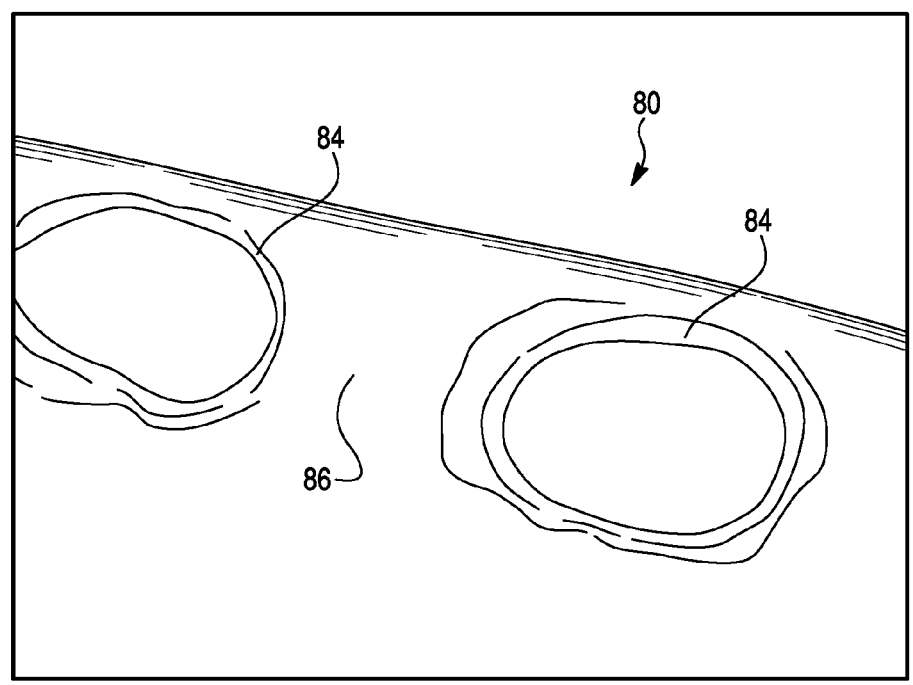
FIG. 8C is a magnified view of the laser etched line shown in FIG. 8B.
Figure 9A:
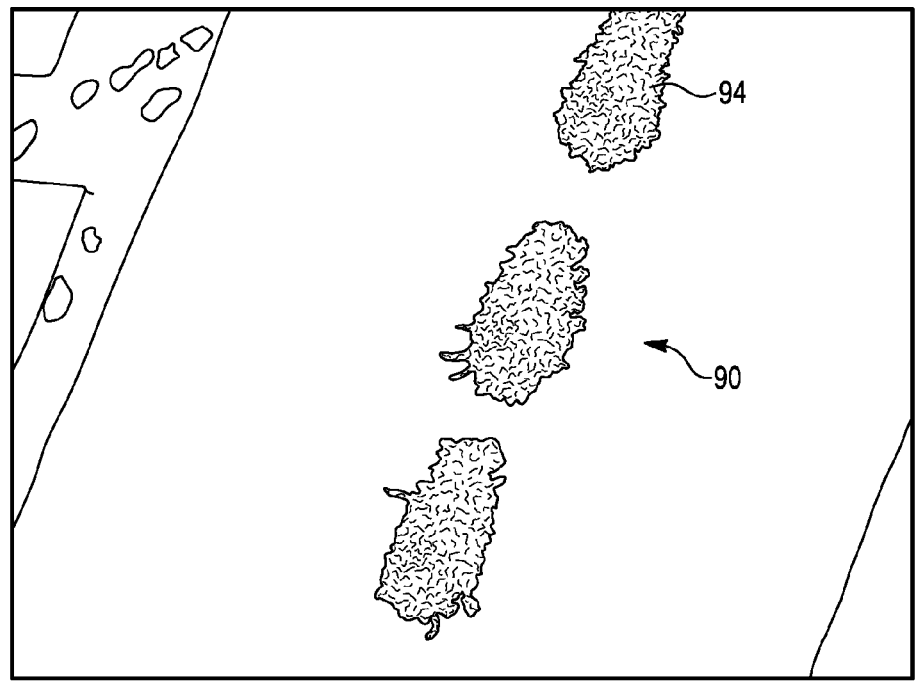
FIG. 9A is an exemplary laser etched line.
Figure 9B:
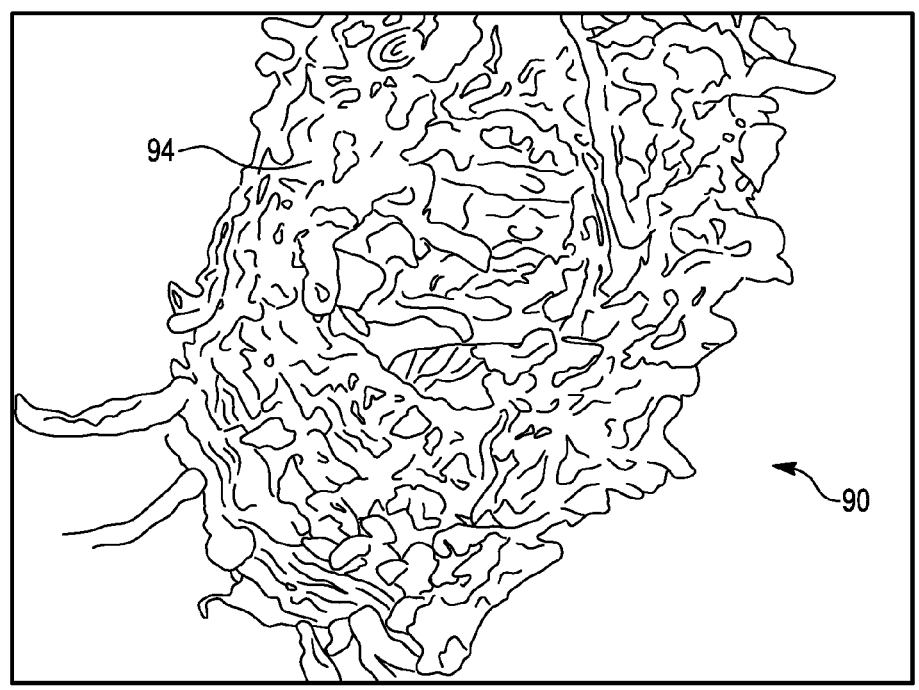
FIG. 9B is a magnified view of the laser etched line shown in FIG. 9A
Figure 10:
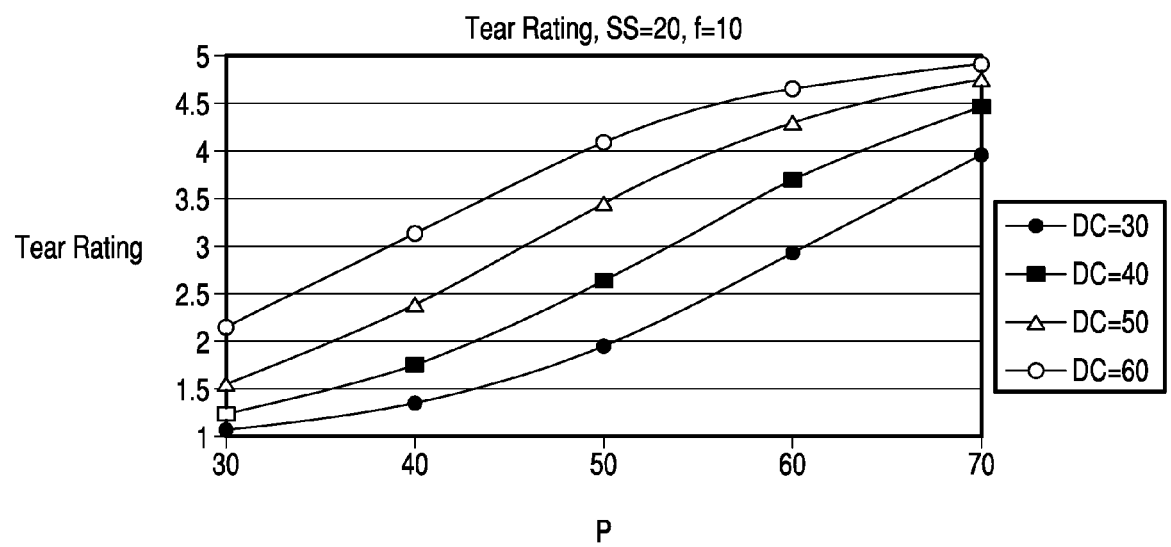
FIG. 10 is a graph illustrating the results of a d-optimal computer designed experiment showing the tear rating for an exemplary laser etched line.
Figure 11:
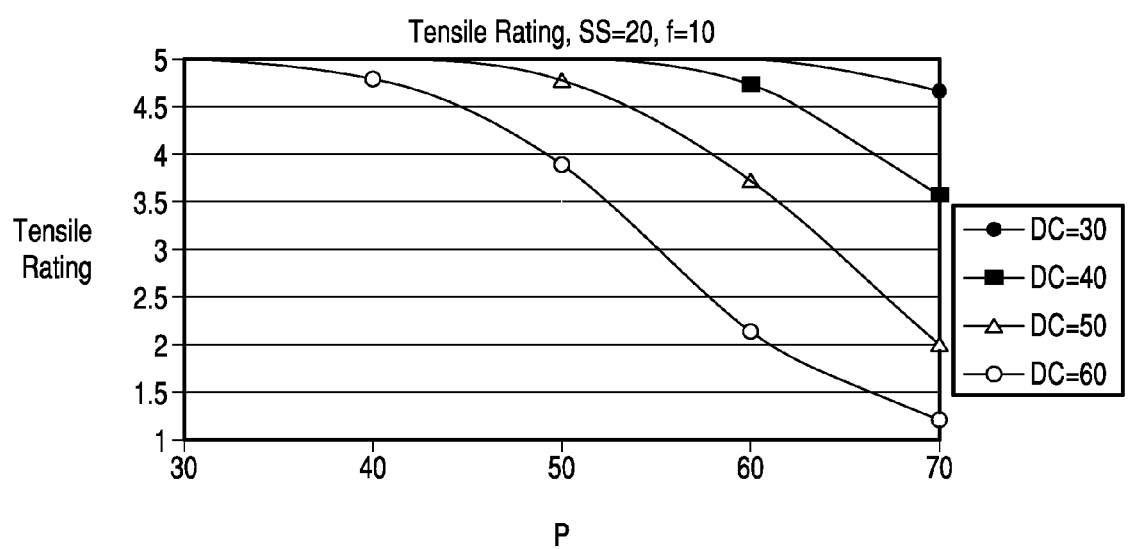
FIG. 11 is a graph illustrating the results of a d-optimal computer designed experiment showing the tensile rating for an exemplary laser etched line.
Figure 12:
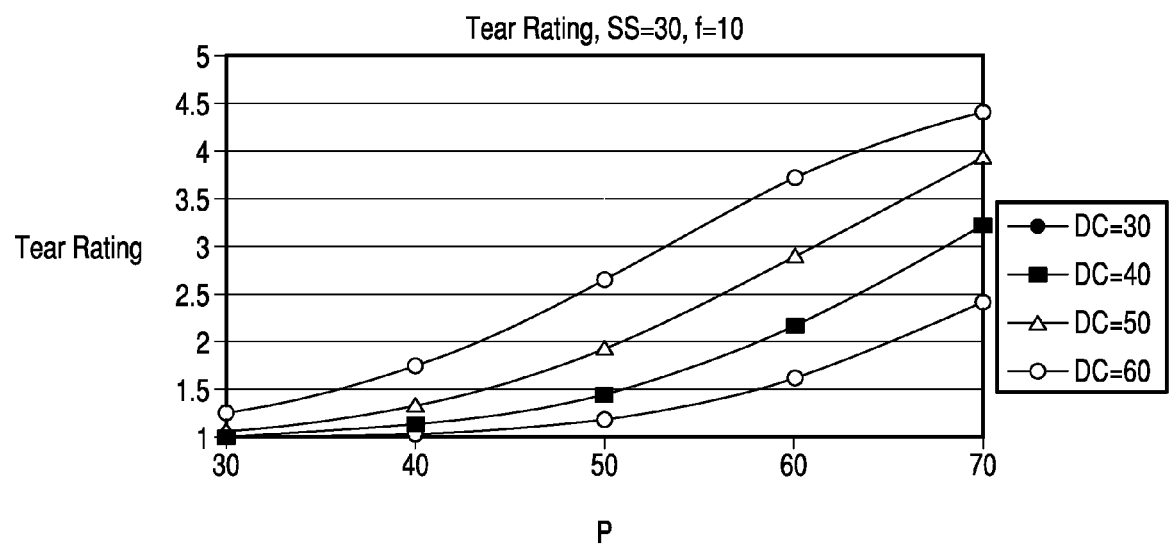
FIG. 12 is a graph illustrating the results of a d-optimal computer designed experiment showing the tear rating for an exemplary laser etched line.
Figure 13:
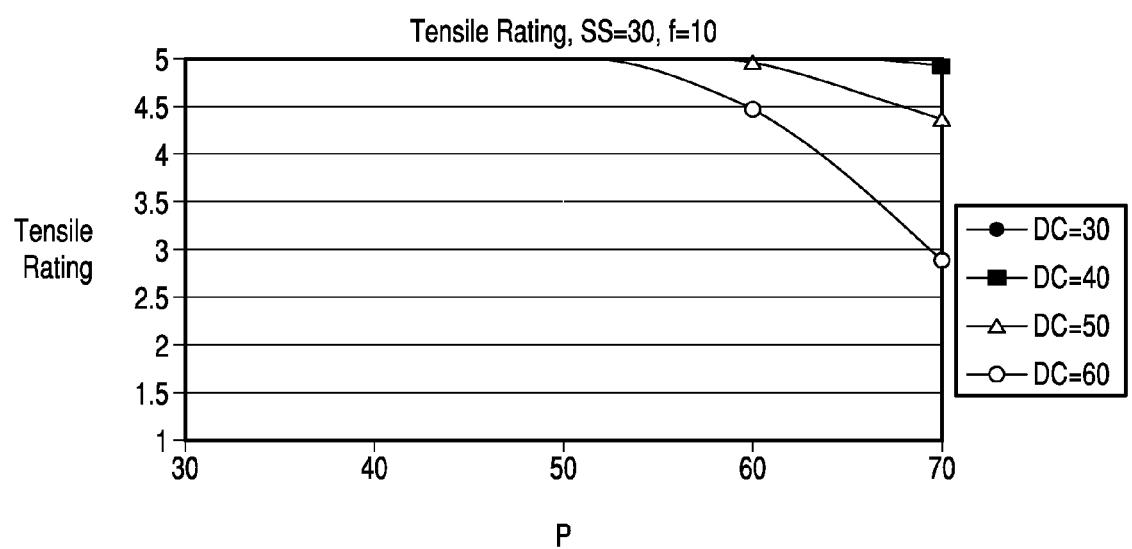
FIG. 13 is a graph illustrating the results of a d-optimal computer designed experiment showing the tensile rating for an exemplary laser etched line.
Figure 14:
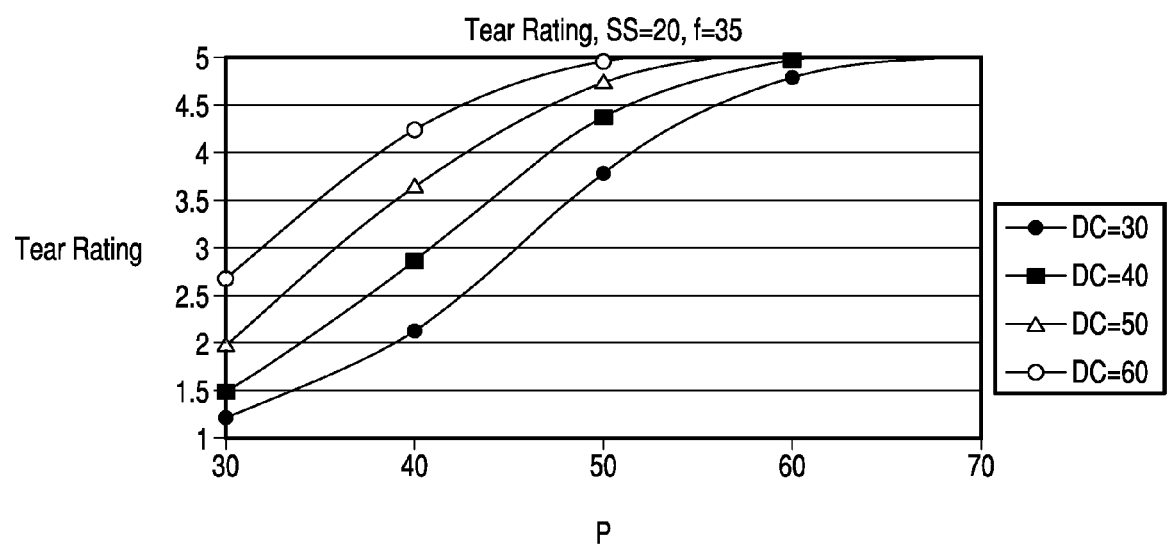
FIG. 14 is a graph illustrating the results of a d-optimal computer designed experiment showing the tear rating for an exemplary laser etched line.
Figure 15:
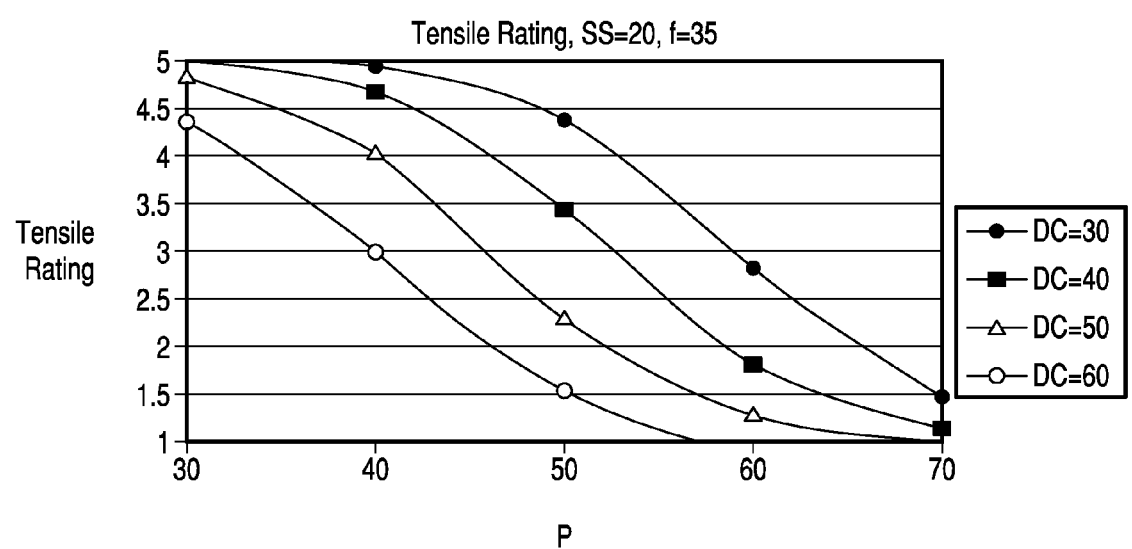
FIG. 15 is a graph illustrating the results of a d-optimal computer designed experiment showing the tensile rating for an exemplary laser etched line.
Figure 16:
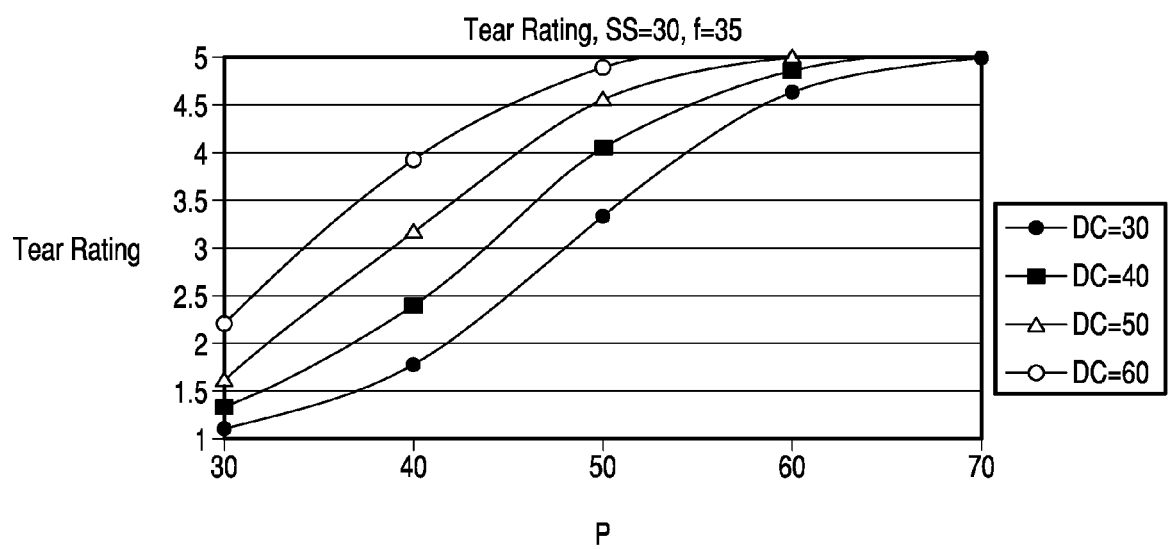
FIG. 16 is a graph illustrating the results of a d-optimal computer designed experiment showing the tear rating for an exemplary laser etched line.
Figure 17:
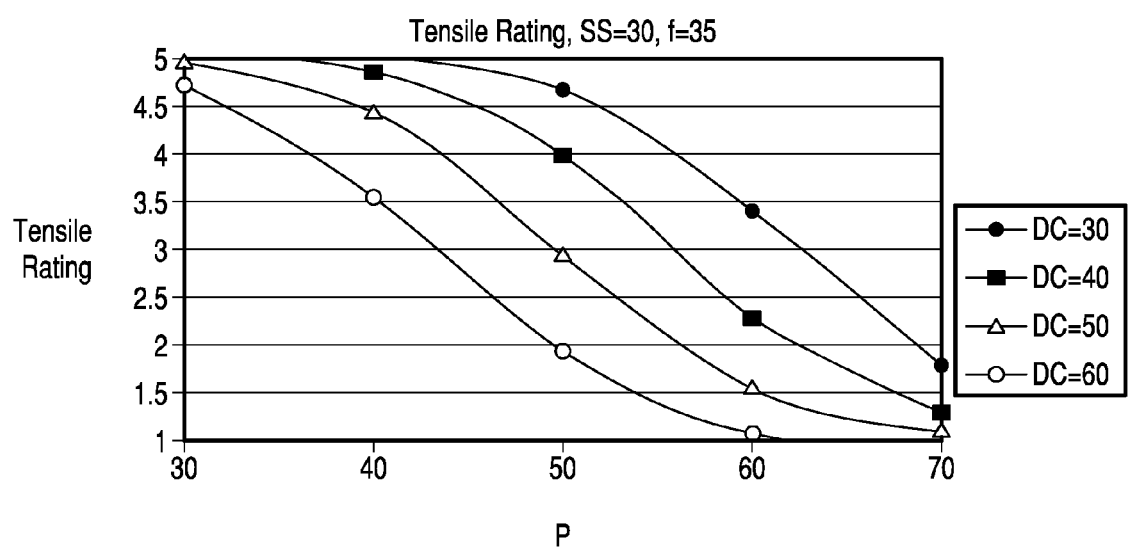
FIG. 17 is a graph illustrating the results of a d-optimal computer designed experiment showing the tensile rating for an exemplary laser etched line.
Figure 18:
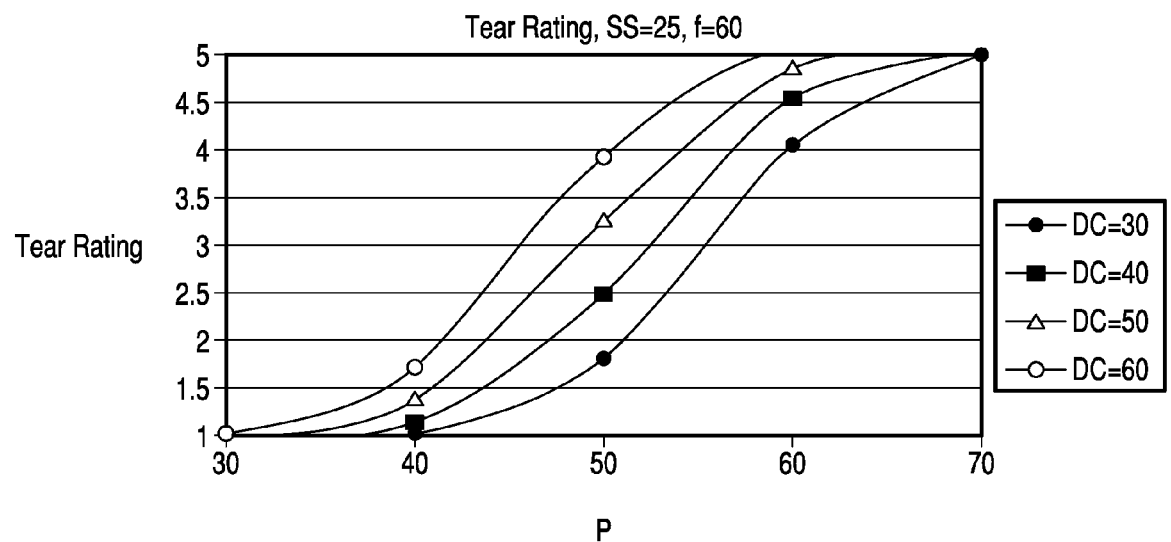
FIG. 18 is graph illustrating the results of a d-optimal computer designed experiment showing the tear rating for an exemplary laser etched line.
Figure 19:
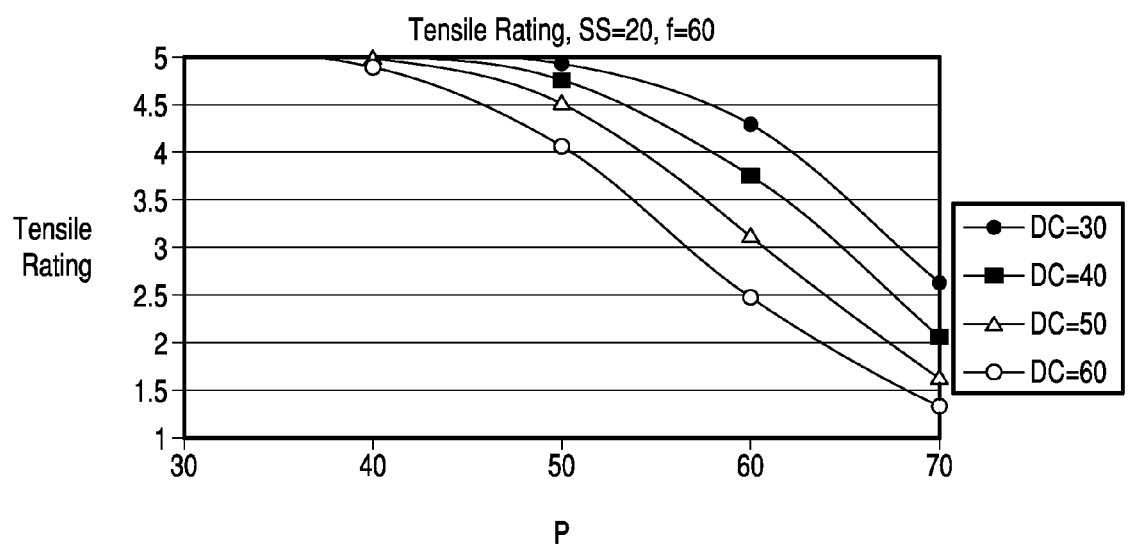
FIG. 19 is a graph illustrating the results of a d-optimal computer designed experiment showing the tensile rating for an exemplary laser etched line.
Figure 20:
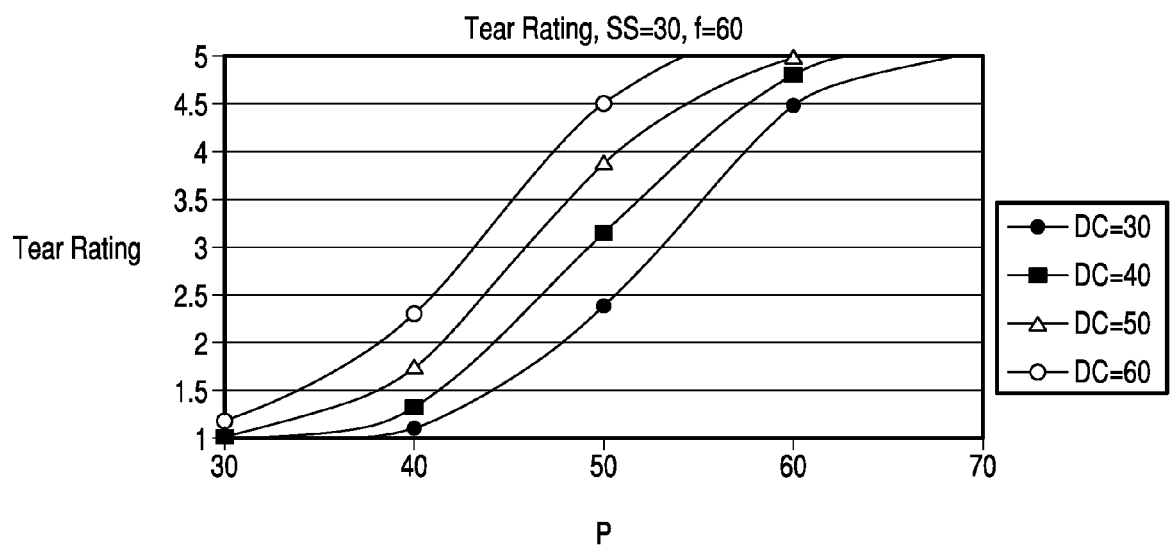
FIG. 20 is a graph illustrating the results of a d-optimal computer designed experiment showing the tear rating for an exemplary laser etched line.
Figure 21:
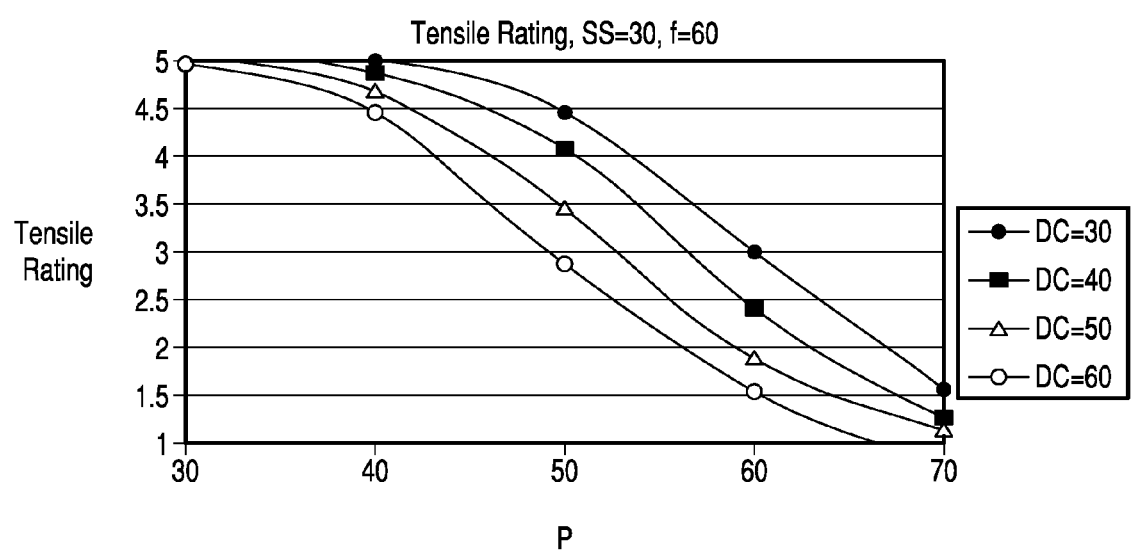
FIG. 21 is a graph illustrating the results of a d-optimal computer designed experiment showing the tensile rating for an exemplary laser etched line.

FIGS. 1-9B illustrate materials with tear lines created using a laser having varying operating parameters. For all of these examples, a 3,000 watt $CO_2$ laser has been used. FIGS. 1-8C represent a line laser etched into OPP tape. OPP tape is biaxially oriented polypropylene film tape, typically coated with a solvent based acrylic adhesive. Any example of OPP tape is produced by the J.V. Converting Company, model number OPP-22CC, the specifications of which are hereby incorporated by reference. This tape is made from 30 micron biaxially-oriented polypropylene, is 2.2 mils thick, and has a typical tensile strength of 20 lb/in. FIGS. 9A and 9B represent a line laser etched into kraft tape. An example of kraft tape is produced by the J.V. Converting Company, model number FPPT-01, the specifications of which are hereby incorporated by reference. This tape is made from kraft flatback paper coated with a natural/synthetic rubber blend adhesive, it is 7 mils thick, and has a tensile strength of 36 lb/in.

Etched kraft and OPP tape are shown here as exemplary embodiments and are not meant to be limiting. A wide variety of tapes, such as, medical, electrical, clear, office, duct, carpet, Velcro, acrylic, non-adhesive, etc., may be laser-etched to create an easily torn material. Similarly, a laser-etched line may be used in place of perforations on a wide variety of web materials such as paper, plastic, leather, metal foils, etc. For each material, the operating parameters may be varied to achieve an optimal balance of a finished product that is easily torn yet retains sufficient strength during use. Various types of lasers may be used and still achieve the desired results. For instance, a 200 watt laser or a yttrium aluminium garnet (Yag) may be used. The use of a Yag laser results in a much smaller beam diameter and therefore may be advantageous in certain applications.

Figure 1B:
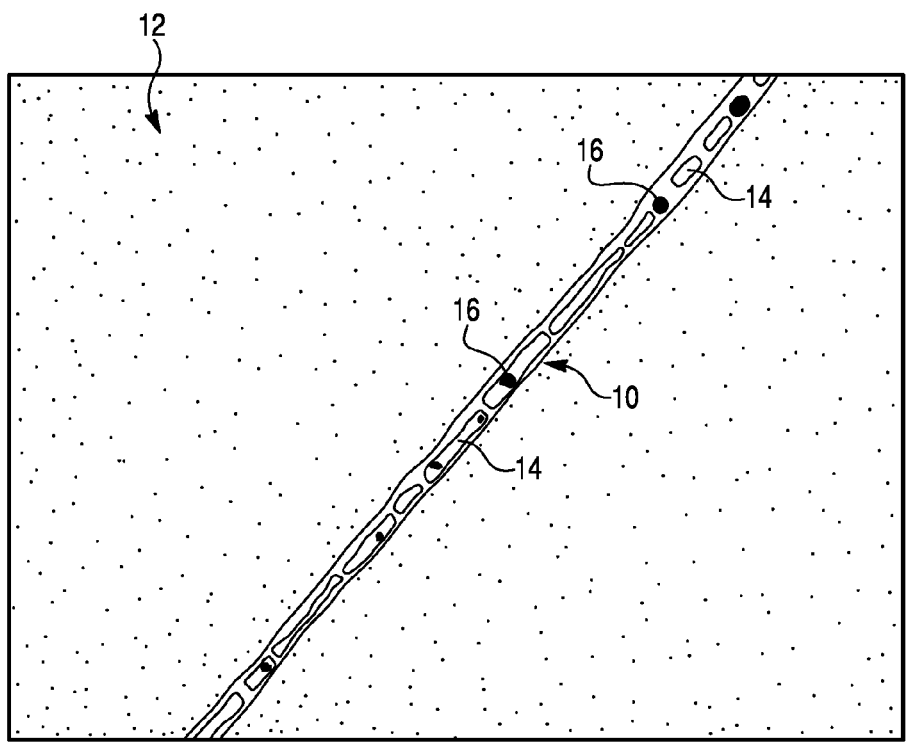
FIG. 1B is a magnified view of the laser etched line shown in FIG. 1A.
Figure 1C:
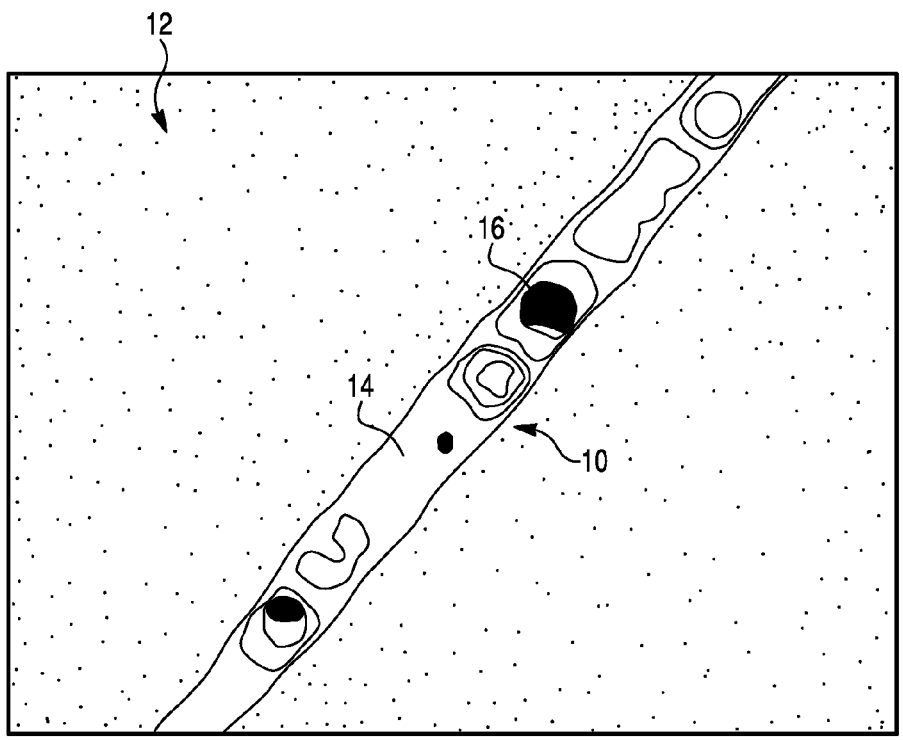
FIG. 1C is a magnified view of the laser etched line shown in FIG. 1B.

FIGS. 1A-C illustrate a line 10 etched into OPP tape 12. In an exemplary embodiment, line 10 is created using a 3,000 watt laser at 40% power, a 60% duty cycle, a scan speed of 20 m/s, and a frequency of 60 kHz. FIG. 1A illustrates the tape 12 viewed through an optical stereo micrograph (OSM). Line 10 contains regions 14 where the surface of the tape 12 has been partially penetrated by the laser. FIGS. 1B and 1C illustrate the same line 10 in more detail viewed through a scanning electron micrograph (SEM). As best shown in FIGS. 1B and 1C the laser penetrates through the tape at regions 16. Line 10 is created in one pass of the laser, the changes in depth at different portions 14, 16 being due to the controlled parameters of the laser. Line 10 results in the tape 12 having good tear and excellent tensile.

Figure 2:
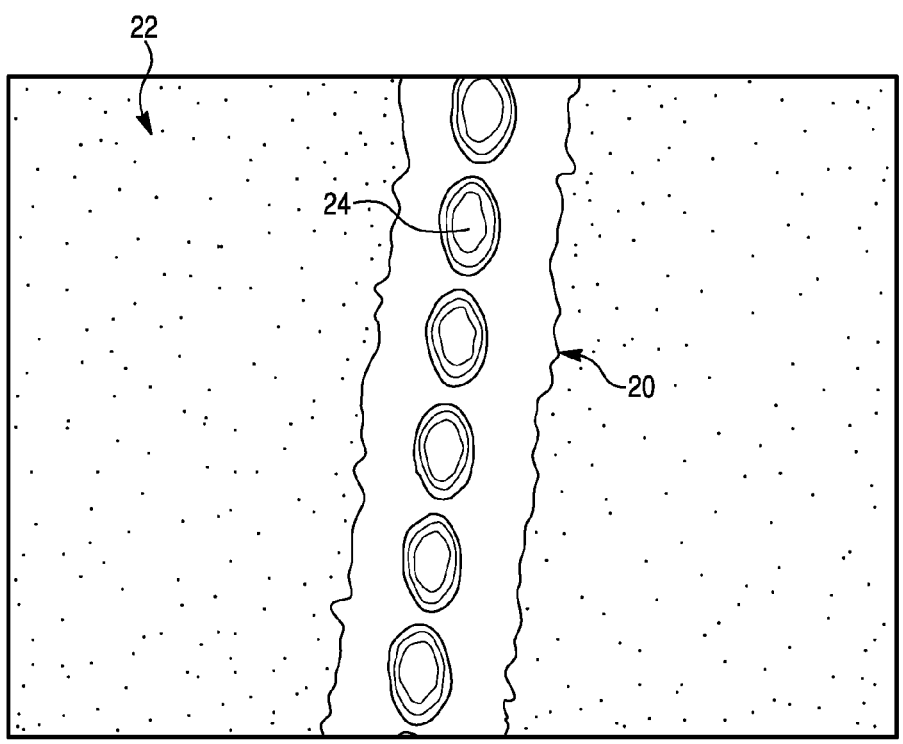
FIG. 2 is an exemplary laser etched line.

FIG. 2 illustrates a line 20 etched into a web of material 22 as viewed through an OSM. In an exemplary embodiment, line 20 is created using a laser operating at 35% power, a 60% duty cycle, a scan speed of 20 m/s, and a frequency of 20 kHz. Line 20 penetrates the surface of the material 22 without etching completely through. This results in craters 24 being formed in the material 22. As best shown in FIG. 2, the craters 24 have a varying profile along their depth resulting from the controlled parameters of the laser. The profiles of the craters 24, along with the other properties of the line 20, result in a material 22 that can easily be torn along the line 20 without deviation, but still retains a sufficient tensile strength. Accordingly, line 20 results in good tear and excellent tension.

Figure 3:
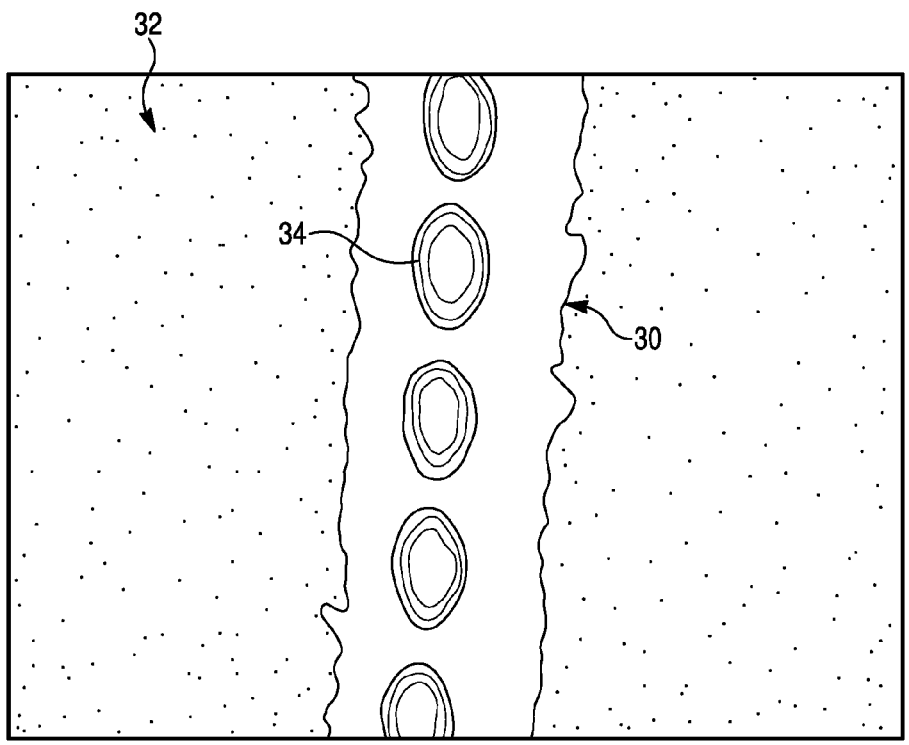
FIG. 3 is an exemplary laser etched line.

FIG. 3 illustrates a line 30 etched into a web of material 32 as viewed through an OSM. In an exemplary embodiment, line 30 is created using a laser operating at 45% power, a 60% duty cycle, a scan speed of 25 m/s, and a frequency of 20 kHz. These parameters create craters 34 along the length of line 30. Though similar to FIG. 2, craters 34 in line 30 are spaced slightly further apart than craters 24 in FIG. 2. This is due to the increased scan speed of the laser, while the frequency remains the same. Though slightly different, both lines 20, 30 exhibit the desired qualities of being easy to tear while maintaining a sufficient tensile strength.

Figure 4:
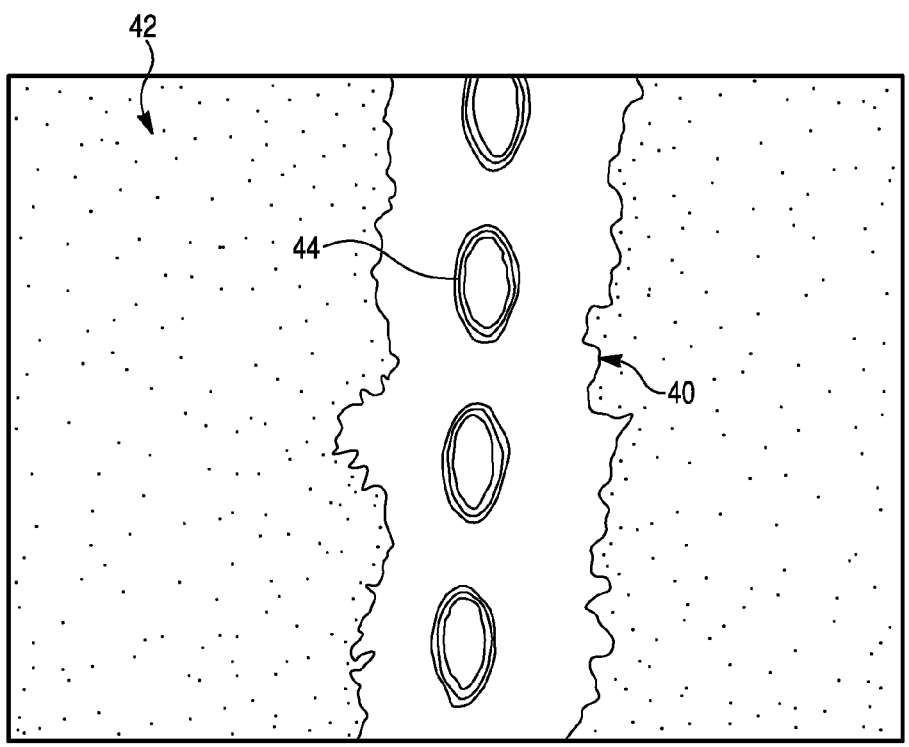
FIG. 4 is an exemplary laser etched line.

A similar line 40 is illustrate in FIG. 4. In this example, the laser is set to 65% power, a 60% duty cycle, a scan speed of 25 m/s, and a frequency of 10 kHz. Again, line 40 is etched without completely penetrating the material 42. This setting creates craters 44 having a varying profile along their depth similar to the lines 20, 30 in FIGS. 2 and 3. Where lines 20 and 30 result in good tear and excellent tensile, line 40 results in excellent tear and good tensile. Therefore, while the ability to tear the material has increased, the tensile strength has been reduced.

Figure 5A:
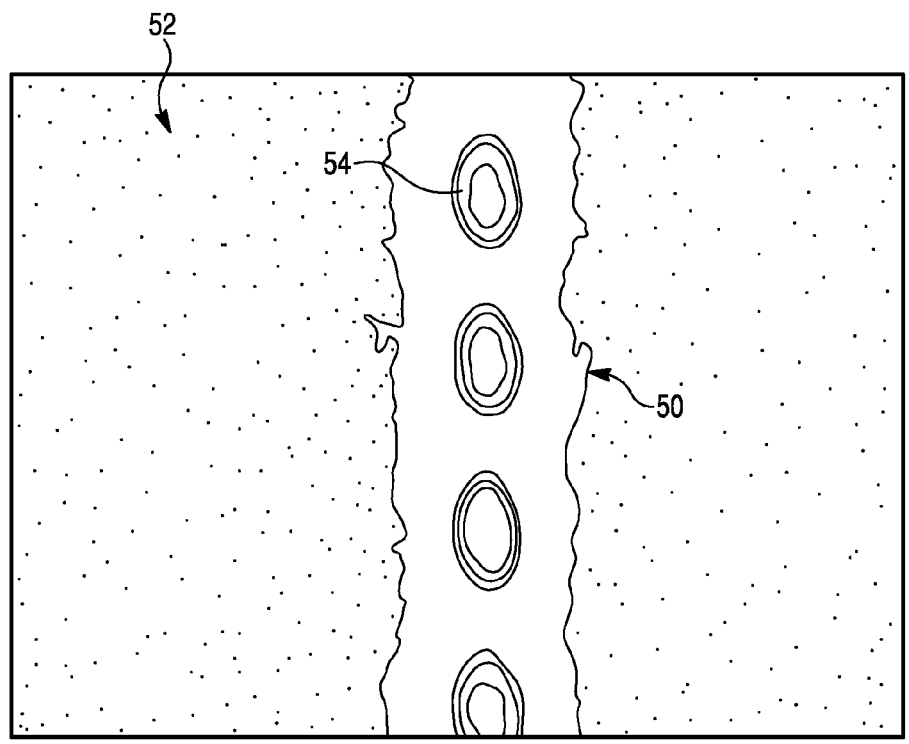
FIG. 5A is an exemplary laser etched line.
Figure 5B:
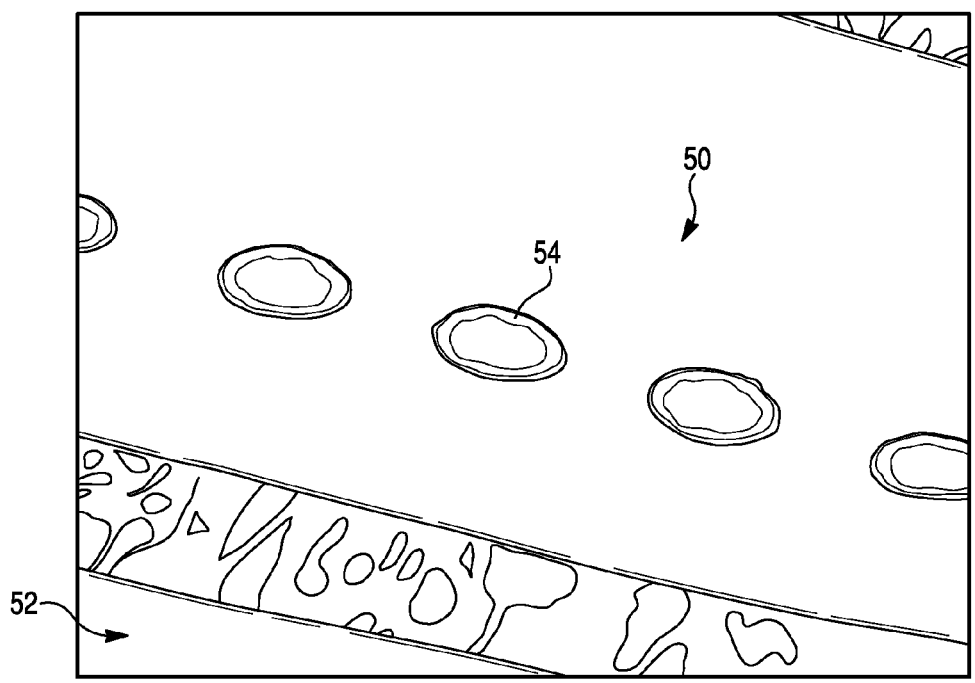
FIG. 5B is a magnified view of the laser etched line shown in FIG. 5A.
Figure 5C:
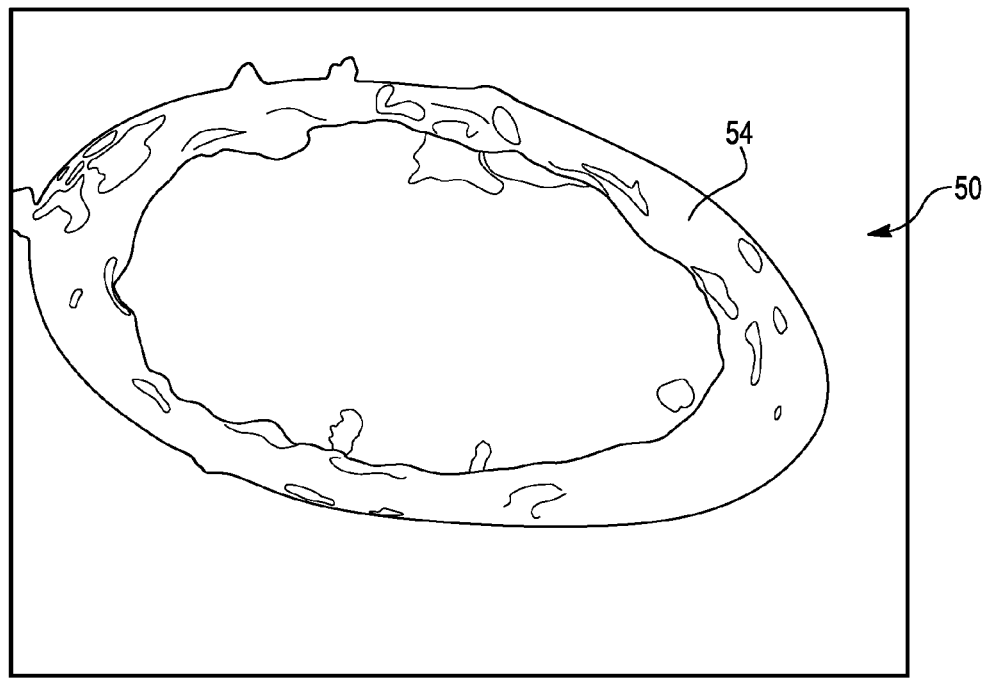
FIG. 5C is a magnified view of the laser etched line shown in FIG. 5B.

FIGS. 5A-C illustrate a line 50 etched into a material 52. FIG. 5A illustrates the line 50 viewed through an OSM, while FIGS. 5B and 5C illustrate the line 50 viewed through a SEM. In an exemplary embodiment, line 50 of FIG. 5A is created with a laser set at 40% power, 60% duty cycle, a scan speed of 30 m/s, and a frequency of 20 kHz. Line 50 comprises craters 54 having a varying profile along their depth. These craters 54 are represented more closely in the SEM images of FIGS. 5B and 5C. Line 50 results in the material 52 having good tear and excellent tensile.

Figure 6:
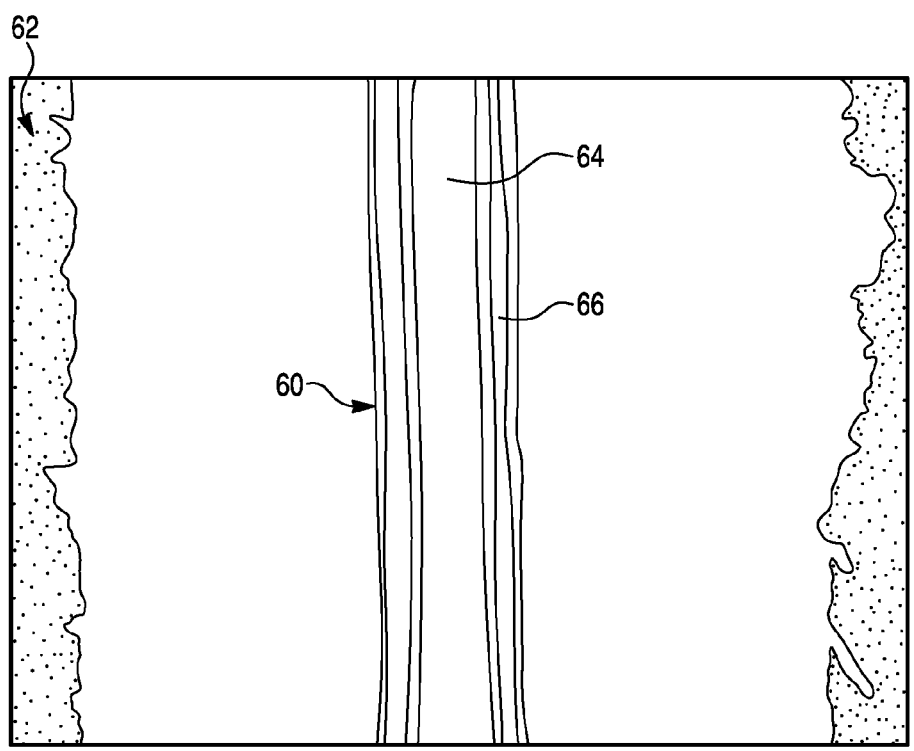
FIG. 6 is an exemplary laser etched line.

As noted above, a change in the operating parameters will produce different surface profiles in the material. As best illustrated in FIG. 6, a line 60 created with a laser set at 55% power, 50% duty cycle, a scan speed of 20 m/s, and a frequency of 60 kHz produces an almost straight trench, without any major craters or holes. The center of this trench 64 has depth greater than the side portions 66 which may be rounded or sloping downwards depending on the parameters of the laser. Though line 60 is different from the others, it still exhibits desired characteristics, having excellent tear and good tensile.

As best represented in FIGS. 1A-6, several totally different surface morphologies can be achieved and produce products with the requisite tearability and tensile strength contemplated by the present invention. While the exact surface characteristics need not be focused on in practicing the present invention, certain surface morphologies may provide advantages in a specific material or application, as will be understood by one of ordinary skill in the art upon viewing this disclosure.

Different operating parameters may create similar surface profiles that exhibit completely different characteristics. FIGS. 7A-C illustrate a line 70 etched with a laser set to 60% power, a 30% duty cycle, a scan speed of 20 m/s, and a frequency of 20 kHz. FIG. 7A illustrates the line 70 viewed through an OSM, while FIGS. 7B and 7C illustrate the line 70 viewed through a SEM. Line 70 of FIG. 7A contains craters 74, penetrating the surface, but not through the material 72. FIGS. 8A-8C illustrate a similar surface profile with line 80 having a number of craters 84 situated inside of a trench 86. Line 80 was etched with a laser set to 60% power, 60% duty cycle, a scan speed of 30 m/s, and a frequency of 60 kHz. FIG. 8A illustrates the line 80 viewed through an OSM, while FIGS. 8B and 8C illustrate the line 80 viewed through a SEM. Though the surface profiles of line 70 and 80 are similar, line 80 exhibits poor tensile strength. Therefore, the increased duty cycle and frequency used to create line 80 results in a material which tears too easily, making it unsuitable for regular use. Line 70, however, holds through regular handling but still exhibits easy tearing when desired. Accordingly, it is not necessarily the number, spacing and size of individual holes or surface elements that determine the results of obtaining both good tensile and good tear, as is typically relied upon in traditional perforations.

FIGS. 9A and 9B illustrate a line 90 etched into kraft tape 92 using a 3,000 watt $CO_2$ laser. The laser was set to 40% power, a 60% duty cycle, a scan speed of 20 m/s, and a frequency of 60 kHz. As best shown in FIG. 9B, the laser partially penetrates the surface of the tape 92 resulting in craters 94.

As best shown in FIGS. 10-21, computer molding was also performed to approximate the results for additional exemplary laser settings. D-optimal computer designed experimental techniques were used to determine the acceptable combinations of laser power, scan speed, frequency and duty cycle to produce a material that is easy to tear but retains sufficient tensile strength. D-optimal computer tests use algorithms based on statistical criteria to evaluate designs. After each test, tear and tensile were each rated 1 to 5 with 1 being the worst and 5 being the best. Tests were performed in iterations, with the results for each previous test determining the parameters for subsequent tests. The points for different duty cycles were tested over power levels (P) between 30% and 70% of the peak laser output for a 3,000 watt $CO_2$ laser. The different graphs represent different scan speeds (SS), measured in m/s, and different frequencies, measured in kHz.

FIGS. 10-21 reveal the response contours for the tested parameters. Comparing FIGS. 10-21 demonstrates that the combination of laser settings which are the absolute best for tear rating would likely be the absolute worst for tensile rating and vice versa. Therefore, in order to identify the combination of laser settings to achieve the best balance between tear and tensile, optimization was performed, assigning equal weights to tear and tensile. If so desired, however, the tear and tensile ratings could be differently weighted depending on the application and the material.

In this case it was derived that optimum settings would achieve a predicted tear rating of 4.35 and a predicted tensile rating of 4.48 for the OPP tape tested. It was determined that exemplary laser settings to achieve this are: 45% power (of the available power of 3,000 watts); 85% duty cycle; 20 m/s scan speed; and 10 kHz frequency. These experiments revealed, however, that there are several other combinations of laser settings that produced good results near this optimum for the specific tape tested.

Additional trials were conducted for a laser with 3,000 watts power and 50 m/s scan speed capability. Two different tapes were used for these trials—Henkel Corporation HP260 OPP tape 3 mils thick (0.003 inches) and Shurtape FP96 Kraft tape 6.2 mils thick (0.0062 inches). Again, it was found that there existed a combination of laser variables such as power, scan speed, frequency and duty cycle that produced the best balance of tear and tensile properties. Table 2 reveals exemplary laser settings for the HP260 tape that produce excellent results and Table 3 reveals exemplary laser settings for the Kraft tape that produce excellent results. It should be noted that these results are not meant to be limiting, and that other values may be used while still falling within the scope of the present invention. The results shown in Table 2 and Table 3 merely highlight that good results can be obtained even at 50 m/s scan speed. This has significant economic impact on the costs to produce easy tear products because most laser systems have significantly limited scan speeds, for instance 4 m/s or less. Accordingly, the processing time for various materials can be significantly reduced over prior methods.

In an exemplary embodiment, a 3,000 watt laser with a 60 inch field size etches lines in a moving 60 inch web of OPP tape material at scan speeds of 50 m/s. Alternately, three high powered lasers each with a 20 inch field size can laser etch lines in the same moving web at high speeds. Traditional laser drilling or perforating of similar materials, in comparison, is quite limited in that 10-15 low powered lasers would be required with each laser's scan speed not exceeding 4 m/s.

TABLE 2

| Power (%) | Duty Cycle (%) | Scan Speed (m/s) | Frequency (khz) | Tear Rating | Tensile Rating |
|---|---|---|---|---|---|
| 60 | 60 | 20 | 10 | 4 | 4 |
| 40 | 60 | 30 | 20 | 4 | 5 |
| 45 | 85 | 20 | 10 | 4 | 5 |
| 65 | 85 | 50 | 20 | 4.5 | 4.5 |

TABLE 3

| Power (%) | Duty Cycle (%) | Scan Speed (m/s) | Frequency (khz) | Tear Rating | Tensile Rating |
|---|---|---|---|---|---|
| 60 | 60 | 20 | 10 | 4 | 5 |
| 55 | 60 | 30 | 20 | 5 | 5 |
| 77 | 85 | 50 | 20 | 5 | 5 |
| 60 | 85 | 50 | 60 | 4.5 | 5 |

Figure 22:
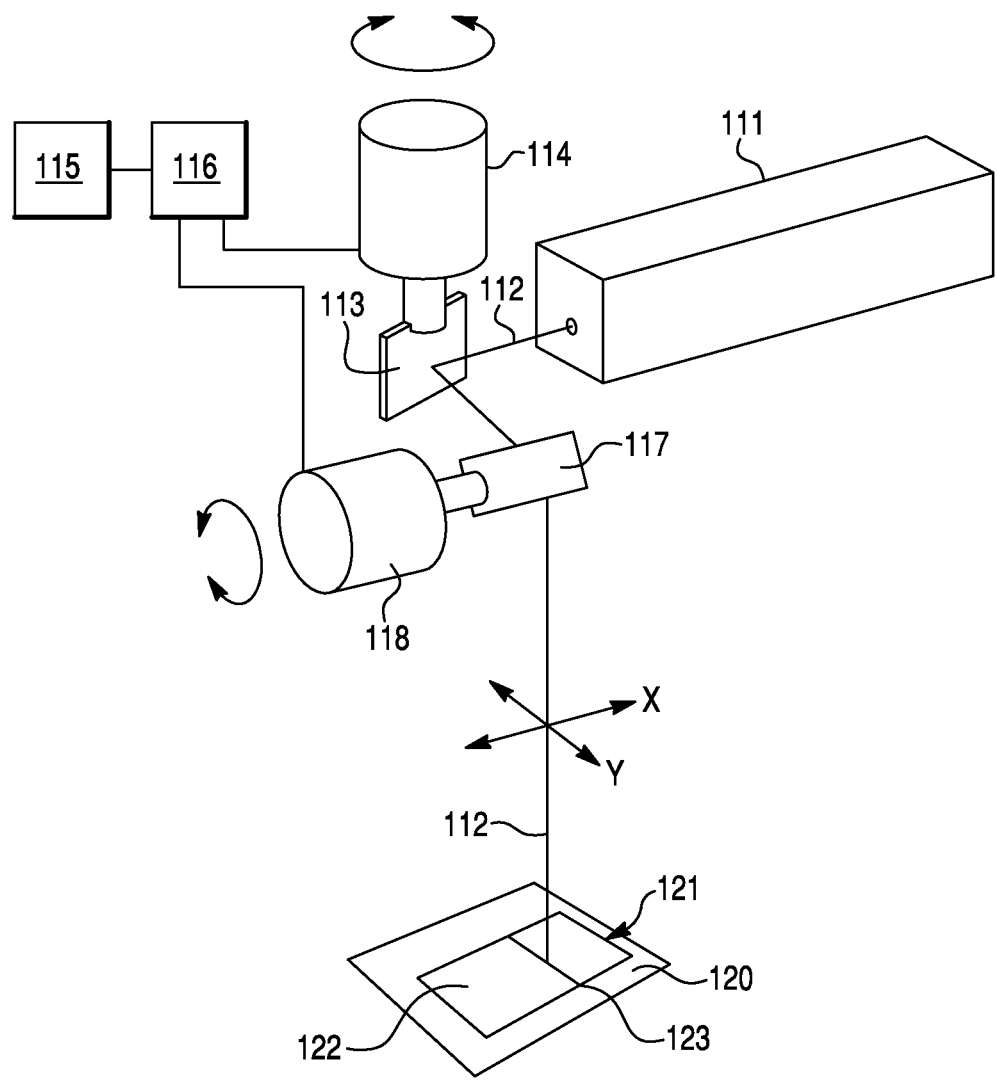
FIG. 22 is an exemplary laser system for etching a line.

In an exemplary embodiment, the etched line is created by moving a laser beam across the surface of the material with galvanometer-driven mirrors. As best shown in FIG. 22, a laser 111 generates a beam 112 directed towards a computer-controlled mirror system.

The illustrated mirror system includes an X-axis mirror 113 rotatably mounted on and driven by an X-axis galvanometer 114. The X-axis galvanometer 114 is adapted to rotate and cause the rotation of the X-axis mirror 113. Rotation of the X-axis mirror 113 while the laser beam 112 is incident on the mirror 113 causes the laser beam 112 to move along the X-axis. A numerical control computer 115 controls the output of a power source 116 which controls the X-axis galvanometer's 114 rotation of the X-axis mirror 113. The laser beam 112 is deflected by the X-axis mirror 113 and directed toward a Y-axis minor 117 rotatably mounted on Y-axis galvanometer 118. The Y-axis galvanometer 118 is adapted to rotate and cause rotation of the Y-axis mirror 117. Rotation of the Y-axis mirror 117 causes movement of the laser beam 112 incident on mirror 117 along the Y-axis. The control computer 115 controls the output of the power source 116 delivered to Y-axis galvanometer 118 for controlling rotation of the y-axis galvanometer 118.

One of ordinary skill in the art will understand that different optics and lenses such as concave lenses, convex lenses, focusing lenses, cylindrical lenses, mirrors, splitters, combiners, or reflectors, etc., can be introduced either before or after the mirrors. The addition of these optics can be used to adjust the properties of the laser and the parameters of the etching operation, as needed for each application.

The apparatus further includes a working surface 120 which can be a solid substrate such as a table or conveyor, or a fluidized bed. Additionally the working surface 120 can just be the working area of the laser 111, where the web of material 121 is moved across, for example from one spool to another, without a specific support structure. A material (or work piece) 121 is placed on the working surface 120. The material 121 includes a surface 122 to be etched. The laser beam 112 is directed by the mirrors 113, 117 against surface 122 of the material 121. Usually the laser beam 112 is directed generally perpendicular to the surface 122, but different outcomes can be achieved by adjusting the angle between the laser beam 112 and the surface 122 from about 45° to about 135°. Relative movement between the laser beam 112 in contact with the surface 122 of the material 121 causes a line 123 to be etched on the surface 122. The movements and timing of the mirrors 113, 117 are controlled by the numerical control computer 115 to etch the line 123. As referred to herein, relative movement may involve movement of the laser beam 112 (e.g., using the mirror system) as the material 121 remains stationary, movement of the material 121 while the laser beam 112 remains stationary, or a combination of simultaneous movement of the laser beam 112 and the material as in the case for a laser etching on the fly continuous printing process. As the material 121 is moved, the laser beam 112 simply etches sections in a periodic fashion by means of the galvo mirrors 113, 117 moving along the axis. The laser beam 112 may be controlled so that the material 121 does not cease movement, but a straight line is still etched therein. Additionally, the laser beam 112 may make a continuous movement across the material 121. It should be noted that a continuous scan of the laser beam 112 may not always result in a continuous line. The duty cycle and frequency of the laser 111 may be controlled so that the laser beam 112 has little or no effect on certain sections of the material 121, thus resulting in a continuously scanned laser beam 112 producing a discontinuous line.

Though a single sheet of material 121 is shown, the invention is ideally implemented using a web of material moving across working surface 120. Depending on the width of material 121 more than one laser 111 may have to be used to create the line 123. If lines in more than one direction are required, for instance vertical and horizontal lines, an additional laser 112 may be used. Of course a single moveable laser may be use to create both lines. Additionally, the web of material 121 may be a solid sheet of material 121 or composed of individual strips of material 121. For example, the material 121 can be different rolls of tape which are already cut into their individual widths. These rolls may be placed on a single web and moved across the working area 120 of the laser or lasers 111. These individual rolls may have the same width or different widths as needed. Alternatively, a large web of a single sheet of material 121 can be moved across the working area 120 and subsequently separated into individual shhets of material 121, having equal or varying widths. Dividing a single sheet of material 121 may be performed by the same laser 111 that laser-etches the line, or it may be performed by a separate laser. It should also be noted, when the present invention is being practiced on adhesive tapes, the operations described herein may be performed either prior to, or subsequent, adhesive being applied to the tape backing.

The laser may be scanned over the material by other effective means than the one shown in FIG. 22. Examples of this include moving the laser 111 in an X-Y fashion, moving the working surface 120 in and X-Y fashion, or a combination of the two. The movement of the working surface 120 and the laser 111 can be achieved, for example, by a lead screw and a linear drive motor, though any suitable method is acceptable. The distance of the laser 111 from the material 121 may be adjusted by moving either the laser 111 or the working surface 120. The system may also include a tank containing an inert gas which is injected into the working zone of the laser.

An additional system and method for controlling the laser is described in U.S. patent application Ser. No. 11/420,543, published as Publication No. 2007/0108170, and incorporated herein by reference.

The feed rate of the web and the operating parameters of the laser may be varied to provide optimal results for different materials. These variables may be regulated by a controller (not shown). In various exemplary embodiments, the controller is a numerical control computer system, though any type of computer system may be used. The laser controller may be the same as the mirror controller 115 or it may be a separate, dedicated unit. The desired parameters may be input by a user into the system, selected from a pre-stored table, or directly calculated based on a system of variables relating to the material characteristics and the desired end product. Any type of programming language may be used to program the controller such as C, Java, Fortran, etc. The process of programming the controller may be carried out locally or over a network.

In various exemplary embodiments, acceptable results can be obtained if the laser power, duty cycle, scan speed, and frequency are controlled and the morphology of the material is ignored. In an exemplary embodiment, the present invention is also directed to a method of optimizing these variables for a specific material. After numerous testing, statistical analysis using D-Optimal experimental design was performed. D-Optimal experimental design allows many variables to be studied efficiently. Uncontrolled variables are averaged out, interactions and curvilinear effects amongst the independent variables are easily analyzed, and undesirable or low information experiments are excluded. An example of a program which implements D-Optimal design is "Experimental Design Optimizer" from Haller Information Technology System. The independent variables and their levels are input into the software program. The output is the specific number of experiments to conduct in order to achieve statistically significant results, the order of the experiments and the levels of each independent variable. In this case, the dependent variables are the tear strength and tensile strength ratings from 1 to 5. The independent variables are the laser power, scan speed, duty cycle and frequency.

After the D-Optimal experiments are performed, the data received from those experiments is analyzed using regression modeling. Regression analysis helps understand how the tear and tensile ratings change when one of the laser parameters are varied while the others remain fixed. Some examples of regression methods that can be used are linear regression, ordinary least squares regression, or forms of nonparametric regression. An example of a program which implements regression analysis is "Multiple Correlation Analysis" from Haller Information Technology System. The data from the statistically designed experiments is entered into this software. The program is then capable of creating a variety of different regression models which quantitatively relate the tear and tensile strength to the laser power, scan speed, duty cycle, frequency and all their interactions.

Finally, the optimum process settings for the best balance of tear and tensile ratings can be determined through mathematical optimization. An example of a program which implements optimization is "Multiple Property Optimization" from Haller Information Technology System. The correlation equations determined from the linear regression serve as the input for this software. Various weights are assigned to the tear and tensile ratings and the software determines the laser power, scan speed, duty cycle and frequency settings for the best balance between tear and tensile. In this manner, sufficient laser parameters can be developed to create desirable qualities on various materials.

The foregoing description of the exemplary embodiments of the present invention has been presented for the purpose of illustration. It is not intended to be exhaustive or to limit the invention to the precise forms disclosed. Obvious modifications or variations are possible in light of the above teachings. For example, other materials, values, and numbers may be used. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. Moreover, features or components of one embodiment may be provided in another embodiment. Thus, the present invention is intended to cover all such modification and variations.

What is claimed:

1. A method of making a tearable sheet comprising:
moving a sheet having a first major surface and an oppositely disposed second major surface relative to a working area of a laser while laser etching with the laser to produce a continuous laser-etched trench in the first major surface, the continuous laser-etched trench forming a continuous tear line of the sheet, and forming with the laser a plurality of craters within the trench, each crater having an overall diameter less than a diameter of the trench adjacent to each crater, wherein at least one crater extends into but not through the sheet, where the at least one crater has a varying profile along a depth of the at least one crater such that the at least one crater has a first diameter at a portion of the trench closest to the first major surface and a second diameter less than the first diameter at a portion of the trench furthest from the first major surface.

2. The method of making a tearable sheet according to claim 1, including the step of selecting the sheet from a material selected from the group comprising a paper material, a plastic material, a leather material, and a metal foil material.

3. The method of making a tearable sheet according to claim 1, wherein said laser etching forms the continuous tear line without completely extending through the sheet to the second major surface.

4. The method of making a tearable sheet according to claim 1, wherein the sheet is tearable by hand along the continuous tear line.

5. The method of making a tearable sheet according to claim 1, wherein the laser has a field size of 20 inches or more.

6. The method of making a tearable sheet according to claim 1, wherein during said laser etching the laser has a power output between 1,000 and 5,000 W, a scan speed between 10 and 50 m/s, and a spot size between 0.05 and 0.3 mm.

7. The method of making a tearable sheet according to claim 1, wherein during said laser etching the laser has an EDPUT between 0.28 and 254.77 watts-sec/mm$^3$.

8. The method of making a tearable sheet according to claim 1, wherein the continuous tear line is wavy, curved, or zig-zag.

9. A method of making a tearable sheet comprising:

moving a sheet having a width, a first major surface and an oppositely disposed second major surface relative to a working area of a laser while laser etching with the laser to produce a continuous laser-etched trench in the first major surface, the continuous laser-etched trench forming a continuous tear line extending entirely across the width of the sheet; and forming with the laser a plurality of craters within the trench each crater having an overall diameter less than a diameter of the trench adjacent to each crater, wherein a plurality of the craters extend into but not through the sheet, where each of the plurality of craters has a varying profile along a depth of each crater such that each crater has a first diameter at a portion of the trench closest to the first major surface and a second diameter less than the first diameter at a portion of the trench furthest from the first major surface.

10. The method of making a tearable sheet according to claim 9, wherein the width of the sheet is at least 20 inches.

11. The method of making a tearable sheet according to claim 9, wherein the sheet is made of at least one of a paper material, a plastic material, a leather material, and a metal foil material.

12. The method of making a tearable sheet according to claim 9, wherein said laser etching forms the continuous tear line without completely extending through the sheet to the second major surface.

13. The method of making a tearable sheet according to claim 9, wherein the sheet is tearable by hand along the continuous tear line.

14. The method of making a tearable sheet according to claim 9, wherein the laser has a field size of 20 inches or more.

15. The method of making a tearable sheet according to claim 1, wherein during said laser etching the laser has a power output between 1,000 and 5,000 W, a scan speed between 10 and 50 m/s, and a spot size between 0.05 and 0.3 mm.

16. The method of making a tearable sheet according to claim 9, wherein during said laser etching the laser has an EDPUT between 0.28 and 254.77 watts-sec/mm$^3$.

17. The method of making a tearable sheet according to claim 9, wherein the continuous tear line is wavy, curved, or zig-zag.

18. The method of claim 1, wherein the plurality of craters are linearly aligned within the trench.

19. The method of claim 1, further comprising at least one crater that penetrates through the sheet.

20. The method of claim 1, wherein the plurality of craters comprises a first crater having a first depth and a second crater having a second depth different from the first depth and wherein the first crater and the second crater do not extend through the sheet.

21. A method of making a tearable sheet, comprising:

forming a trench in a first surface of a material using a first laser operating parameter, and forming a plurality of craters within the trench using a second laser operating parameter different from the first laser operating parameter each crater having an overall diameter less than a diameter of the trench adjacent to each crater, wherein each crater formed within the trench has a varying profile along a depth of each crater such that each crater has a first diameter at a portion of the trench closest to a first major surface and a second diameter less than the first diameter at a portion of the trench furthest from the first major surface.

22. The method of claim 21, wherein the first laser operating parameter is selected from at least one of a first power, a first duty cycle, a first scan speed, a first frequency, a first control factor setting, a first jump speed, and a first objective lens size, and the second laser operating parameter is selected from at least one of a second power, a second duty cycle, a second scan speed, a second frequency, a second control factor setting, a second jump speed, and a second objective lens size.

23. The method of claim 21, including the step of forming the trench with center and side portions, wherein the center has a depth greater than the side portions.

24. The method of claim 21, wherein the trench and the plurality of craters are formed using a single laser.

25. The method of claim 21, wherein the trench and the plurality of craters are formed without etching completely through the material.

26. The method of claim 21, wherein the material is selected from at least one of a paper material, a plastic material, a leather material, and a metal foil material.

* * * * *